May 31, 1960

W. L. HAMILTON 2,938,438

VIBRATORY COMPACTOR

Filed July 28, 1955

INVENTOR.
WILLIAM L. HAMILTON

BY Hyde, Meyer, Baldwin & Doran
ATTORNEYS

May 31, 1960

W. L. HAMILTON 2,938,438

VIBRATORY COMPACTOR

Filed July 28, 1955

INVENTOR.
WILLIAM L. HAMILTON
BY
Hyde, Meyer, Baldwin & Doran
ATTORNEY

May 31, 1960 W. L. HAMILTON 2,938,438
VIBRATORY COMPACTOR
Filed July 28, 1955 4 Sheets-Sheet 4

INVENTOR.
WILLIAM L. HAMILTON
BY
ATTORNEYS

United States Patent Office 2,938,438
Patented May 31, 1960

2,938,438

VIBRATORY COMPACTOR

William L. Hamilton, Willoughby, Ohio, assignor to Baldwin-Lima-Hamilton Corporation, Lima, Ohio, a corporation of Pennsylvania Filed July 28, 1955, Ser. No. 524,913

49 Claims. (Cl. 94—48)

This invention relates to improvements in vibrator units and fluid devices and more particularly to vibrator shoes, mounting construction thereof, and propelling vehicle therefor; and to fluid motors and pumps having toothed, meshing rotors.

One of the objects of the present invention is to provide a vibratable shoe characterized by one or more of the following features: a vibrator and a motor driving it, both carried by the shoe with the power supplied to the motor through a flexible connection; the motor for the vibrator being a fluid motor; the fluid motor being of the gear type having two meshing gears; and/or the gears being each drivingly connected to one of two unbalanced rotatable masses synchronously driven but in opposite directions with the construction having one or more of the following advantages: the gears both supply the driving power and synchronize rotation of the vibrator masses, the construction eliminates a plurality of parts, the gears absorb end thrust and locate the masses axially, and since substantially no power is transmitted through the gear teeth, the gears may be made of soft bearing-like material, a one-piece end cap may be supplied to the motor housing, the gears may have a higher coefficient of thermal expansion than the surrounding housing to permit cold motor starts, the gear teeth may have a high pressure angle, and/or the gear teeth may have a contact ratio of approximately unity.

A further object of the present invention is to provide a two gear fluid motor or fluid pump wherein the load thereon or driving power thereto is divided in predetermined ratio between the gear shafts so that one or all of these last five mentioned advantages in the previous paragraph are obtainable.

A further object of the present invention is to provide a fluid pressure driven vibrator shoe having a completely enclosed housing; being compact, rugged and free to move in space; having positive lubrication of the motor and/or the vibrator by the driving fluid; having no breather port; and/or having a vibrator rotatable in fluid with the eccentric mass thereof mounted in a sealed cylinder to reduce windage loss.

A further object of the present invention is to provide a material compacting shoe and supporting arm construction with the shoe vibration taking place perpendicular to the arm; the arm being pivotally supported and capable of raising and lowering the shoe, inclining the shoe slightly to allow easier "sledding," and permitting free vibration in the material contacting position; the vibration of the shoe and/or the line of impact of the material on the shoe extending through the center of percussion about the pivot; a rubber dampener in the pivot to provide pivoting by torsion of the rubber; and/or means to take the weight of the shoe off the rubber in the shoe raised position to reduce stress on the rubber.

A further object of the present invention is to provide a vehicle having a vibratable shoe and especially adapted for compacting ground material over which the vehicle passes wherein the front is made especially light and the driving motor thereof is located over the rear rolling support means; a plurality of vibratable shoes located between front and rear roller support means on the vehicle; an operator's station located over the vibratable shoes for maximum visibility and minimum dust; a plurality of shoes arranged transverse to the direction of vehicle movement; and/or the outer shoes movable between an outer and inner position to change the width of the vibrated path and, if necessary, to change the overall width of the vehicle.

A further object of the present invention is to provide a vibratable shoe closely adjacent to a heavy roller so that the vibration zone extends through the material compacted by the roller to provide maximum compaction not attainable with either by itself.

A further object of the present invention is to provide a compaction vehicle having a vibratable shoe, a motor for driving the vehicle, and means for preventing vibrating of the shoe unless the vehicle is traveling forwardly or rearwardly.

A further object of the present invention is to provide a vehicle with a fluid pressure driven vibratable shoe, and a fluid cooler on the vehicle for dissipating the heat carried away by the fluid.

A further object of the present invention is to provide a static weight adapted to resiliently urge one or more vibratable shoes into firm contact with the material being compacted by vibration wherein the shoes will not transfer force through the weight sufficiently close to the resonant frequency thereof to be capable of inducing substantial amplitude of vibration thereto.

A further object of this invention is to provide a mechanism characterized by its structural simplicity, compactness of construction, economy of manufacture, strong and sturdy nature, operating efficiency, superior operating characteristics, ease of operation and ease of conversion from operative to transportable positions.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 11 is a schematic transverse sectional view through the vehicle of Fig. 1 (with parts removed for clarity) with a weight construction added to improve the material compacting action of the shoes; while

Before the mechanism here illustrated is specifically described, it is to be understood that the invention is not limited to the structural details or arrangement of parts here shown since mechanisms embodying the present invention may take various forms. It is also to be understood that the phraseology or terminology herein employed is for purposes of description and not of limitation since the scope of the present invention is denoted by the appended claims.

While each of the features of this invention might be adapted to various uses, I have chosen to illustrate the same in connection with a material compacting mechanism, and more specifically a soil or road building material compacting vehicle.

Figure 1:
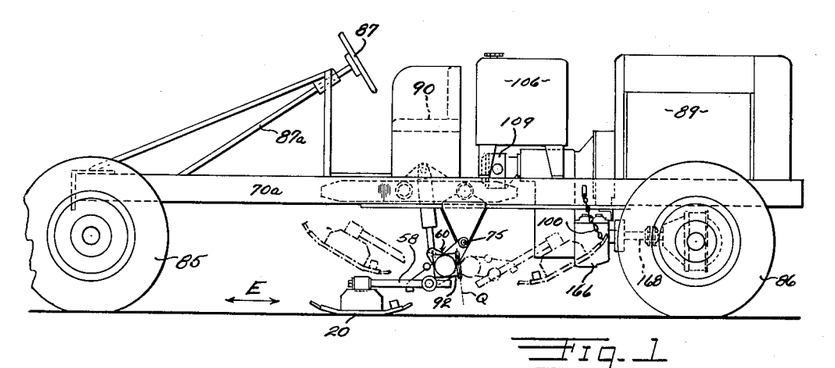
Fig. 1 is a side elevational view of a self-propelled vehicle incorporating the present invention with the vibratable shoes thereof shown in a plurality of positions by solid and dot-dash lines.
Figure 2:
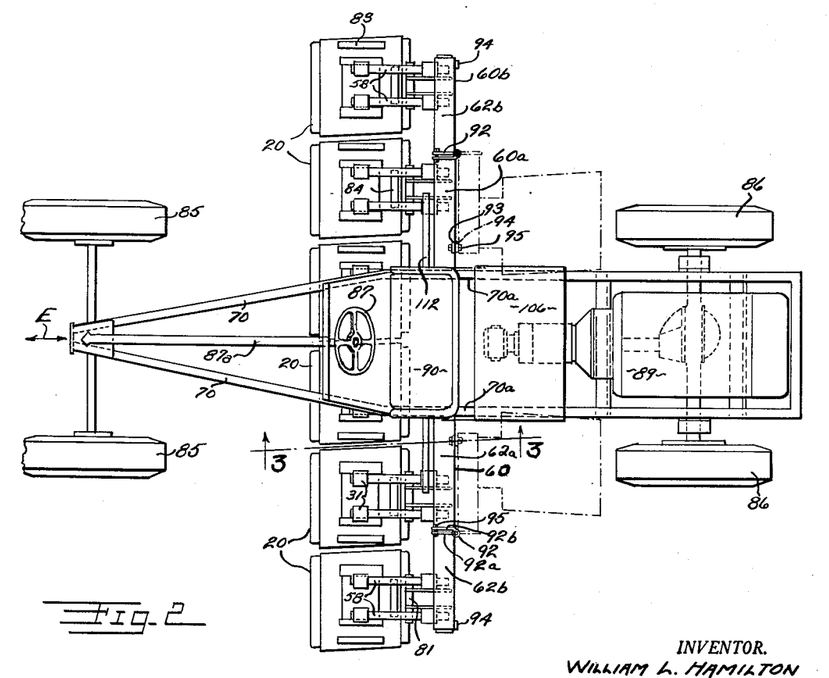
Fig. 2 is a top plan view of the vehicle in Fig. 1 with the end shoes thereof shown in both solid line and dot-dash line positions.

The material compacting vehicle illustrated in Figs. 1 and 2 has a plurality of vibratable shoes 20, here shown as six in number extending transversely across the vehicle with the shoes shown in solid line in Figs. 1, 2, 3 and 4 being in engagement with the ground or other material to be compacted. Each shoe includes a shoe frame with a means for vibrating the shoe taking the form in Figs. 6, 7 and 8 of a vibrator 21 and a vibrator driving motor 22 drivingly connected thereto by a suitable shaft coupling means. Both the vibrator and the motor are carried with the shoe.

Figure 6:
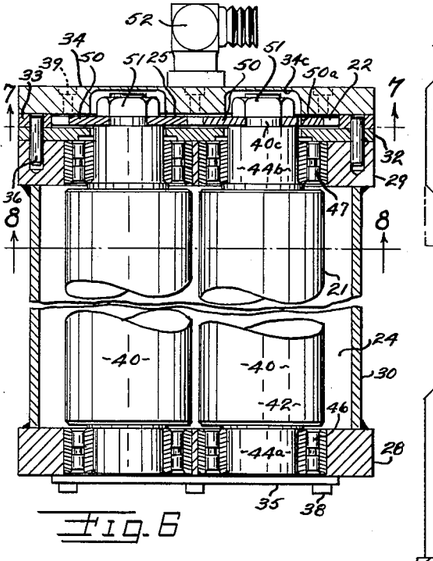
Fig. 6 is an enlarged horizontal sectional view through the vibratable shoe of Figs. 1 to 4 taken along the line 6—6 of Fig. 3.
Figure 7:
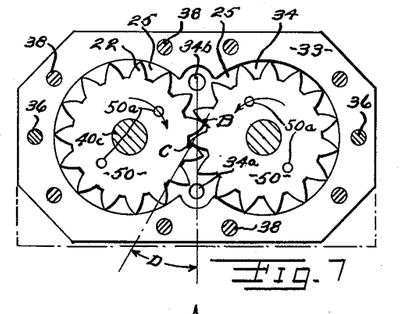
Fig. 7 is a vertical sectional view taken along the line 7—7 of Fig. 6 through the fluid motor.
Figure 8:
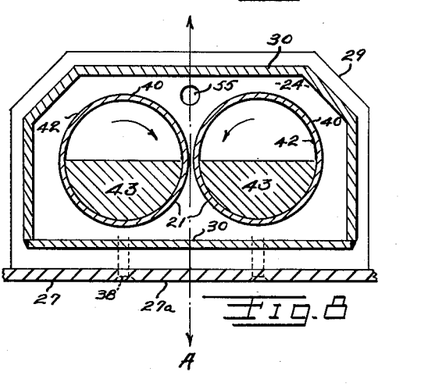
Fig. 8 is a vertical sectional view taken along the line 8—8 of Fig. 6 through the vibrator of the shoe.

The shoe includes in Figs. 6, 7 and 8 a housing comprising a vibrator housing with a chamber 24 therein for the vibrator and a motor housing with a chamber 25 therein for the rotatable parts of the motor. The composite housing is formed from a sole plate 27 with a material compacting bottom face 27a; two end wall members 28, 29 welded or otherwise secured to housing walls 30 forming the housing around chamber 24; a wear plate 32; a gear plate 33; a motor cover or housing end cap 34; and a bearing cap 35. End wall member 29, wear plate 32 and gear plate 33 are detachably connected together but accurately aligned in assembled relationship by locating pins 36. Screws 38 secure sole plate 27 to the end members 28, 29; bearing cap 35 to end member 28; and wear plate 32, gear plate 33 and motor cover 34 to end wall member 29.

Vibrator 21 may be of any suitable type, such as a single unbalanced eccentrically mounted rotatable mass, but is shown herein as taking the form of two rotors 40, 40 providing two unbalanced but equal, high inertia masses rotatably mounted in chamber 24 to be driven synchronously but in opposite directions so that the line of vibration thereof is along line A in Fig. 8 with only a vertical vibrational movement since the horizontal movements tend to cancel each other out as the rotors 40, 40 rotate in the direction of the arrows therein in Fig. 8.

Since the vibrator and motor parts to the right and to the left of a vertical center line through the shoe in Fig. 6 are identical, generally only one will be described and the other one will have an identical reference numeral.

Unbalanced mass or rotor 40 has an imperforate, sealed cylinder 42 having a lead weight 43 extending throughout the length of the cylinder 42 and of uniform, semi-circular cross section secured to the bore of this cylinder 42. Secured to opposite ends of cylinder 42 are coaxial shaft portions 44a, 44b providing for bearing purposes the equivalent of a continuous shaft extending through the cylinder 42. These shaft portions are mounted respectively in bores of end wall members 28, 29 by bearings 46, 47 with these bearings being preferably of the type that are only radially loadable but not capable of taking an end thrust.

The motor 22 may be of any suitable type but is preferably a fluid actuated type driving motor with this being preferably of the gear type. Here, the motor includes two motor gears 50, 50 of equal size and meshing together while rotatably mounted in the motor housing chamber 25. These gears are non-rotatably secured by any suitable keying means, such as pins, to the same ends of the parallel shafts adjacent bearings 47, 47. Gear 50 is secured on a coaxial reduced diameter 44c of shaft portion 44b in Fig. 6 by a nut 51 screwed on the outer threaded end thereof to force the gear against the shoulder formed by the larger diameter of shaft portion 44b. Hence these gears, rigidly secured to the shafts, locate the vibrator rotors and shafts axially and absorb any end thrust thereof since the gears are sandwiched between wear plate 32 and motor cover 34. Motor cover 34 has a high pressure inlet port 34a near the bottom thereof in Fig. 7 and a low pressure outlet port 34b near the top thereof with these ports straddling the mesh of gears 50, 50 so that the high pressure fluid, in traveling from port 34a to port 34b, will cause the gears to rotate in the direction of the arrows while the fluid is carried from one port to the other in the pockets between the gear teeth. Each port may be equipped with a similar elbow fitting 52 for connection to a fluid pressure system carried by the vehicle frame, as will be explained in more detail hereinafter.

The advantages of this construction are many. Notation should be especially made of the simplicity of construction wherein a single part performs a multiplicity of functions and wherein the inherent characteristics of the construction are capable of overcoming many problems encountered in prior devices.

First, gears 50, 50 provide the motive power for motor 22 and also keep the vibrator rotors 40, 40 rotating synchronously but in opposite directions. This is a dual function for these gears. If a different type of motor were used to drive one of these rotors, a separate set of gears would be required to keep these rotors rotating in this relationship. When they rotate synchronously but in opposite directions, they rotate at equal speeds and the weights 43, 43 in Fig. 8 are always at the same vertical location and symmetrically oriented with respect to vibration line A so that the vibration will extend along the line A in the vertical direction but the horizontal components will be cancelled out.

Second, the parts required for the motor and vibrator are reduced in number. In contrast with the construction having a separate gear type fluid motor driving only one of the rotor shafts and with two additional gears keeping the rotors rotating synchronously but in opposite directions, the following parts are eliminated: two gears since gears 50, 50 both synchronize the rotors 40, 40 and act as the rotors of the driving motor; four bearings normally required to rotatably support opposite ends of each of two shafts of the gear motor; a coupling device between the motor 22 and vibrator 21; two shafts lubrication seals with one on the driving shaft of the motor and the other on the driven shaft of the vibrator to prevent lubrication leakage from the respective housings; a second wear plate for the gear motor; and two separate shafts for the motor gears.

Third, since each gear drives one of the two equal sized rotors, the load driven by each gear is substantially equal and substantially no power is normally transferred through the mesh of the gears since each gear produces only the torque load absorbed by the shaft upon which it is mounted. In contrast, the conventional gear motor has one output shaft, has each gear generating half the power, and has the gear remote from the output shaft transmitting its power for half the load through the mesh of the gears to the gear on the output shaft. Since no power transmission is required through the mesh of the illustrated gear construction, there is no power transmission loss in the mesh of the fluid motor gears and in the mesh of the gears required to synchronize the rotation of rotors 40, and the bearing load from the gear separating force is zero. Hence, the gears may be made of weaker material, may have a weaker tooth design, or may have a different tooth form better adapted for fluid motor use.

Making the gears of different material (since they do not have to have sufficient strength to transfer half the power through the mesh thereof) provides a multiplicity of advantages. The gears may be made of relatively soft material instead of heat-treated alloy steel as would otherwise be standard practice. The gears may be made of bronze, aluminum bearing alloy, or any other bearing-like material with their straddling plate 32 and 34 being steel wear plates; this is a transposition of materials from a standard gear pump or gear motor. Then, the fourth, fifth and sixth advantages, mentioned immediately hereinafter, are obtained.

Fourth, motor cover or housing end cap 34 can bear directly against the gears to serve as the wear plate, to close one end of the motor housing chamber 25, and to close the fluid pockets on the outer side of the gears 50, 50.

Fifth, using gears of bearing-like material permits making the smaller part of the high-priced material instead of the larger wear plates 32, 34 for a substantial cost saving. Also, the gear may be of fairly narrow width to achieve further cost saving since the teeth thereof are required to transmit substantially no power, and certainly much less than one-half of the total load of rotating both rotors 40, which would be the load required in a standard gear motor.

Sixth, gears 50, 50 made of a bearing-like material, have an extremely desirable differential thermal expansion with the surrounding steel housing. The gear material will have a higher coefficient of thermal expansion than the surrounding housing. If the gears are closely fitted to the housing to prevent appreciable leakage therepast when rotating under normal operating conditions with both the gears and the fluid hot, the gears will have a loose fit when they are cold. Then, the gear motor, even though cold, may be started rapidly by hot fluid (at normal operating temperature). A rapid cold start with a standard gear motor having bearing metal wear plates and steel gears would be ruinous because seizure of the gears would occur. In the present construction, any loss of efficiency due to leakage when the shoe is cold quickly disappears as the motor warms up. The ability to put hot fluid into a cold shoe is important in the present invention not only when the shoes are originally started to vibrate but also when the end shoes are swung from their dot-dash line position in Fig. 2 to the solid line position (from inactive to vibratable positions) in a manner to be described more in detail hereinafter.

Since the gears transfer substantially no power, a different gear tooth form and gear design may be used to greater advantage. Good design in a conventional gear motor requires a high-pressure-angle gear tooth with a low contact ratio. Gear contact ratio is defined as the ratio of the arc of action to the circular pitch wherein: (1) the arc of action is the arc of the pitch circle through which a tooth travels from the first point of contact with the mating tooth to the point where contact ceases, and (2) the circular pitch is the length of the arc of the pitch circle between the centers or other corresponding points of adjacent teeth. The high-pressure-angle gear tooth has a pyramidal form which gives less tooth and more space between the teeth for a larger hydraulic displacement for a given gear size. This in turn results in a smaller motor, but even more important, lighter bearing loads for a given capacity motor because of less gear cross sectional area (in a plane perpendicular to the line connecting the inlet and outlet) subject to hydraulic pressure. Bearing capacity is always a critical item in all gear motor design. However, the power transmitted between the gear teeth causes a larger separating force because of the higher pressure angle, and this force creates a bearing load at least partially canceling the advantage of the lighter bearing loads mentioned before. A low contact ratio is desirable (this is a characteristic of a high-pressure-angle tooth form) because less fluid is trapped between the contacting teeth in mesh. Minimum trapping is desired because when two successive teeth are in mesh, they form a sealed compartment which reduces in volume as the teeth go through the pitch point. If the fluid being compressed is not relieved, very high pressures will result in high power loss and in increased bearing load. Naturally, the lower the contact ratio, the less fluid will be trapped and the less will be the disadvantage. However, the contact ratio in the conventional gear motor might be as high as 1.3 to 1.4 to provide a smooth, continuous, overlapping transfer of power between the gears since one-half the load is transferred through the mesh. However, since substantially no power is transferred between the gears in the present design, these limitations do not exist and the following two advantages are obtained.

Seventh, a higher pressure angle D in Fig. 7 of approximately 30°26′ and a diametrical pitch of 4 may be used to provide a smaller tooth size and a larger space between the teeth for a larger hydraulic displacement for a given gear size. This large pressure angle causes no increase in bearing load because no separating force exists between the gears with no power transmitted through the mesh thereof.

Eighth, the gears may have a contact ratio of approximately one to minimize the compression of the fluid in the space between the contact points B and C in Fig. 7 since substantially no power is transmitted between the gears at the mesh thereof. With a unity contact ratio, trapping of fluid between the contact points is of no consequence since one gear makes contact at approximately the same time the other breaks contact and there is no appreciable compression of the fluid in the space therebetween. The design of the present invention can use gears with a unity contact ratio since a smooth, continuous, overlapping transfer of power between the gears is not necessary. The high inertia of vibrator rotors 40, 40, rotating at equal speeds, assure a smooth rotation of the load and gears.

Other advantages also result from this construction.

Ninth, since gears 50, 50 are secured non-rotatably and against axial movement to the ends of their respective shafts, they act as thrust bearings between plates 32 and 34 to locate the vibrator rotors 40, 40 axially and eliminate the need for any other separate thrust bearing which might be necessary.

Tenth, it is a compact, rugged vibratable shoe freely movable in space without restriction. In contrast, when a shoe vibrator is driven by a belt from a motor on a vehicle instead of by the fluid motor in the present disclosure, the movement of the vibrator in relation to the power source is hard on the belt and its life is very short. Also, the resulting arrangement is very bulky and spread out, and the shoe must be kept in alignment with the power transmission parts, such as a flexible shaft or belt, so that the shoe is not free to move in space without necessity for this alignment. Mounting the power source on the vibratable shoe itself eliminates the transmission problem; no other compact power source, such as an electric motor, has been found inherently rugged enough to withstand as powerful a vibration.

Eleventh, forced lubrication feed of the bearings is provided, and no breather port is required on the housing to relieve the air pressure changes within the vibrator housing due to temperature changes. Since the fluid used to drive fluid motor 22 is generally a lubricating oil, forced feed of some of this oil may take place into the rotor housing chamber 24 to lubricate the bearings 46 and 47 in Fig. 6. A fluid passageway is provided from the inlet high pressure port 34a in Fig. 7 to vibrator chamber 24 for lubrication purposes. The fluid oil travels from port 34a in Fig. 7 between the lower faces of gears 50, 50 and plate 32 in Fig. 6 toward shaft portions 44b, 44b; through the bores in plate 32, through bearings 47, 47; and into vibrator chamber 24. Also, fluid may flow in another path from port 34a between the upper face of each gear and cover 34 in Fig. 6 to recess 34c, through pressure equalizing holes 50a extending axially through each gear, and through the bore in each plate 32 to chamber 24. Hence, the relatively loose fit of the gears in the housing forms part of the passageway and permits substantial leakage of the fluid past the gears when the shoe is cold to assure adequate lubrication in chamber 24 at starting. The fluid may return from chamber 24 and travel out of the shoe through the outlet port 34b by any suitable vent means, such as, the same clearance passageways between the gear faces and straddling plates, if desired, or a vent hole 55 in Fig. 8 provided from chamber 24 through end wall member 29, wear plate 32, and gear plate 33 to the outlet port 34b on the upper side of the housing if more positive circulation of the oil through chamber 24 is desired. Thus, unfailing, force feed lubrication is automatically provided to all of the working parts.

Figure 10:
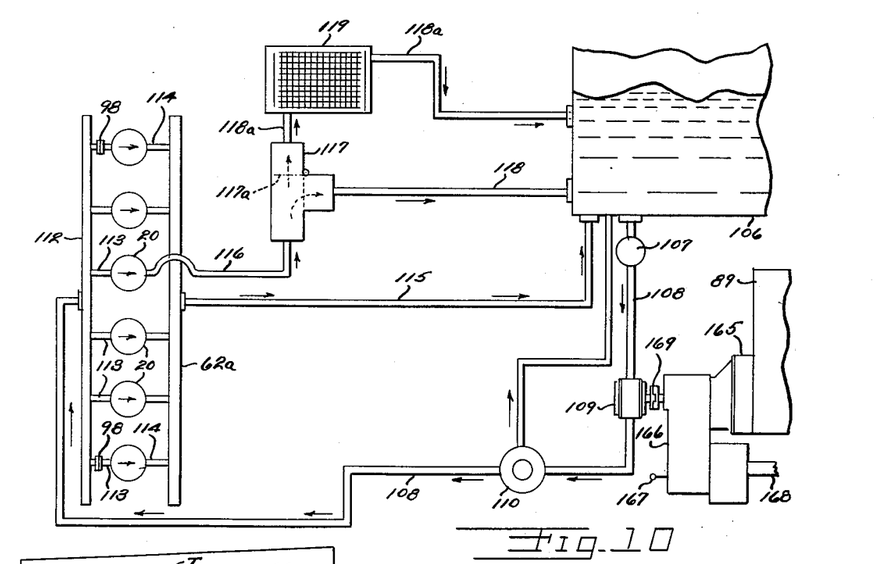
Fig. 10 is a diagrammatic layout of the fluid flow circuit for vibrating the individual shoes in Fig. 2 and of the power drive for both the fluid pump in this circuit and the rear wheels of the vehicle.

Twelfth, the heat generated in the vibratable shoe 20 can be carried away with the fluid oil to be dissipated at a more convenient place, such as on the propelling vehicle through the radiator shown in Fig. 10. Heat dissipation is a serious problem because the material compacting vehicle moves very slowly so that wind velocity will not normally dissipate the heat in the shoe and because the vibratable shoe 20 generally operates down in the dust so that the parts must be sealed against rapid wear with this sealing preventing quick heat dissipation. When the shoe is driven by either an electric motor mounted thereon or by driving belts from a power source on the vehicle, accumulation of heat will substantially shorten the wear life of the drive. Also, it is necessary to dissipate the heat from the lubricating oil in the vibrator. If the oil is confined within the vibrator chamber 24, the frictional heat of the bearings, of the rotation of rotors 40, and of the shoe impact with the ground material will cause the lubricating oil to carbonize within a short time if adequate cooling is not provided.

Thirteenth, a shoe housing for both the vibrator 21 and the fluid motor 22 is completely enclosed against fluid leakage or dirt entry. By eliminating a breather hole from the vibrator chamber 24, which was previously required to relieve air pressure changes in the vibrator housing due to temperature changes, the shoe is completely sealed from dirt and moisture so that the parts will have a long wear life. Also, the shoe may operate under water, may be vibrated in wet cement, or may be dragged through loose dirt without damage.

Fourteenth, cylindrical cylinder 42 of vibrator rotor 40 is imperforate in construction so as to reduce the "windage loss" in the fluid oil by presenting a smooth, cylindrical peripheral surface rotating about its longitudinal central axis in the fluid of chamber 24. The upper half of cylinder 40 in Fig. 8 has only air therein so as to provide the eccentric mass relationship of weight 43. If holes were provided in the periphery of cylinder 40, the fluid could leak into this air space to cause a loss of unbalance in the eccentric weights.

Although the shoes are disclosed here as being a plurality in number adapted to slide over earth material and compact it during travel of the compelling vehicle, the vibratable shoes could have other uses and the material vibrated or compacted might take other forms. One or more of the shoes could be submerged in wet cement to vibrate it during placement. One or more of the shoes could be hooked to a propelling vehicle to compact the material spread in a ditch beside an existing pavement when the pavement is to be widened. One or more of the vibratable shoes could be hooked to a propelling vehicle, such as a crawler tractor being used with a back filling attachment, to compact the soil or sand being back filled in the trench, for example, over a pipe line. Then, it might be dragged along the ditch by the fluid hoses or by a steel cable bundled with the hoses. One or more of the vibratable shoes could be fitted with a plow handle and manipulated over the material to be compacted by an operator.

The vibratable shoe also has other uses in addition to compacting material. One could be attached to a vibrating table on which various materials, such as manufactured components, are being tested for vibration resistance. A vibratable shoe could be attached to a material bin to eliminate "bridging" of cohesive materials therein. A vibratable shoe could be attached to a road material spreader to aid in the spreading action.

In a broader sense, the first nine aforementioned advantages may be utilized in other gear motor and gear pump constructions and applications wherein each shaft carries a predetermined percentage of the load approximately inversely proportional to the pitch diameter of and the r.p.m. of the gears, here disclosed as one-half the load, so that substantially no power is transmitted through the gear mesh. In the illustrated construction, a fluid gear motor driving unit drives the vibrator serving as a driven load unit with the two shafts operatively connecting the units and with the load approximately equally divided between the shafts rotating in opposite directions at the same r.p.m. A fluid gear pump might incorporate these advantages when it serves as a driven load unit if a driving motor unit were designed to supply each shaft, for example, with equal power and driven at equal speeds in opposite directions. In either the gear pump or gear motor, the fluid driven rotors may take the form of gears, peripheral toothed rotors (such as rotors of the Roots blower type having lobes on the periphery thereof), etc. rotatably supported in a housing to permit carrying fluid from port to the other in pockets between the teeth.

Support structure is provided for the vibratable shoes 20 in Figs. 1, 2, 3, 4 and 9, but is equally suitable for any type vibratable shoe, with the structure especially adapted to be secured to a vehicle frame in the manner illustrated, and to move the shoes from a vibratable, active position in material contact to an inactive, raised position with the driving fluid to the shoes shut off. This support structure includes a plurality of arms 58, each including a pair of identical arm portions 58a, 58a; a shoe support member 60 extending generally transverse to the direction of vehicle travel with a cross tube or cross piece 62 similarly oriented; and means to connect these parts together, to the shoes and to the frame to provide the raising and lowering operation of the shoes shown in Fig. 3. Although this cross tube 62 is primarily a structural member for holding the vibratable shoes 20 and arms 58 in their proper relationship to the vehicle frame, it will be apparent as the description proceeds that it also functions as the low pressure manifold for collecting the fluid oil from the several shoes 20, helps to cool the returning oil by its large metal mass and large peripheral surface, serves as part of the shoe hoisting system through a coaction with the arms 58, and serves as a support for the high pressure manifold and the hoses carrying oil to and from the shoes.

Figure 3:
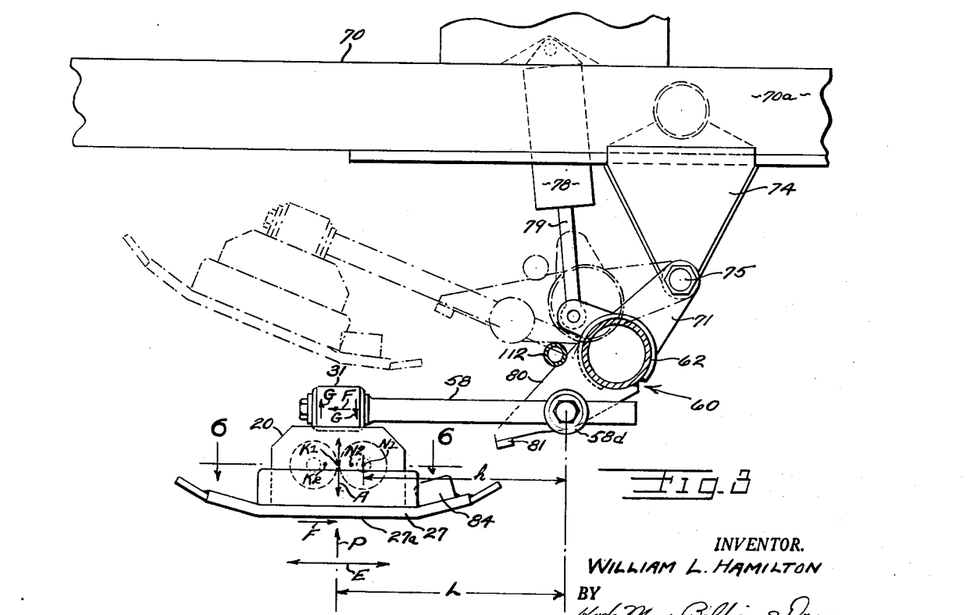
Fig. 3 is an enlarged side elevational view taken along line 3—3 in Fig. 1 of one of the vibratable shoes and their mounting structure shown in a material compacting or lowered position in solid lines and in a raised position for transportation in dot-dash lines.
Figure 4:
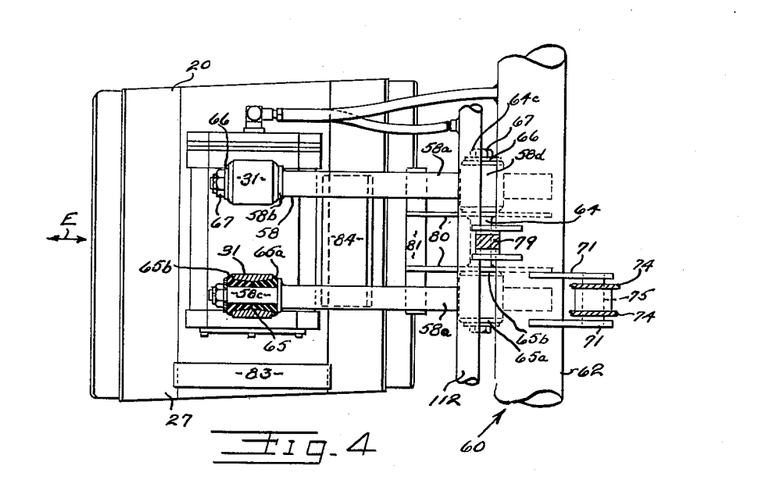
Fig. 4 is an enlarged top plan view of the vibratable shoe and mounting structure thereof in Fig. 3 with the end connection of one of the arm portions for shoe support shown in horizontal section.

Figs. 3 and 4 disclose in detail the specific means for supporting each shoe individually from support member 60. This includes arm 58 or other suitable shoe carrier, herein disclosed as two generally parallel arm portions 58a, 58a as the preferred construction but replaceable by a single arm if so desired. Since both arm portions are identical only one is sectioned in Fig. 4 and only one will be described. The arm portion 58a extends along the direction of vehicle travel and is generally horizontal so that vibration of shoe 20 along line A in Fig. 3 will cause a vertical packing action of the material under the shoe and the material will not be shoved in a hill ahead of the shoe, as sometimes occurs when the line of vibration is not vertical to the material surface.

At opposite ends of each arm portion is located a vibration dampener of similar construction but right angularly arranged; only one is illustrated in detail in Fig. 4. Each includes a shaft element 58c of arm portion 58a or 64c (the latter being an outer end of a cross shaft 64); sleeve element 31 welded to shoe outer wall 30 or sleeve element 58d welded between two different coaxially arranged sections of arm portion 58a; a flange shoulder 58b of arm portion 58a or abutment surface on plate 80 welded to cross tube 62; an annular vibration dampener bushing 65 manufactured of rubber or any other suitable resilient material and formed of two bushing portions 65a and 65b having their tapered outer surfaces telescoped into the sleeve element tapered bores and cylindrical inner surfaces telescoped over the shaft elements, having these surfaces fixed respectively to the associated elements and being located between these elements; and a nut 67 and washer 66 adapted to be applied over the threaded outer ends of shaft portions 58c and 64c to axially compress the dampener bushings 65 against the opposite shoulder 58b and plate 80. The taper on the rubber insert portions 65a, 65b allows the rubber to be put in radial compression; to be easily disassembled or assembled; and to carry axial loads without the usual flanges thereon, separate rubber thrust washers on opposite ends, or rubber to metal bonds. Bushings 65 isolate the associated elements one from the other to permit all modes of vibration. Similar design of all bushing portions permits interchangeability of parts and reduction in replacement inventory.

The shoe 20 could be secured to the arm 58 in any suitable manner or by any suitable shock absorbing means but preferably operatively connected substantially rigid thereto by the illustrated construction not only to isolate the vibration of the shoe but also to resist rotation of the shoe about the transverse axis of the vehicle by the connection with the arm so as to resist the couple caused by material contact with the shoe face 27a during vehicle travel in the direction of arrows E.

As the vehicle travels forwardly or rearwardly, a couple is exerted thereon tending to turn the shoe about a transverse axis, such as the couple forces F, F in Fig. 3 exerted on the shoe as the vehicle travels forwardly. However, the rubber dampener within sleeve elements 31 resist by couple forces G, G and prevent shoe tipping. A similar action occurs when the vehicle moves in the reverse direction. In contrast, a tranverse horizontal pivotal connection between the shoe and the arm, no matter how the shoe is counter weighted, would permit the shoe to tip when traveling forwardly or rearwardly.

Support member 60 is provided with suitable means to raise the shoes 20 from the ground for maneuvering the vehicle. Although support member 60 may be moved by vertical translation movement in slide guides or in any other suitable manner, rotational or pivotal lifting movement is preferred with cross tube 62 in Figs. 3 and 4 having two pairs of lugs 71 with the pairs spaced along the length thereof. Each pair of lugs is pivotally secured to one of the opposite parallel portions of frame members 70a, 70a of vehicle frame 70 by a pair of lugs 74, 74 depending down from each member 70a and having a pivot pin 75 at their lower end connected to lug 71 to provide a horizontal transverse pivotal axis to permit movement of support member 60 relative to frame 70 for raising and lowering the shoes 20. Two extensible links, spaced along the length of cross tube 62 and located under parallel frame members 70a, 70a, are each pivotally connected at opposite ends in Fig. 3 to a frame member 70a and cross tube 62 for raising and lowering support member 60 and each takes the form in the present construction of a fluid pressure actuated cylinder 78 and piston rod 79.

The rubber dampeners within sleeve elements 58d in Fig. 4 not only isolate vibration but also permit a limited amount of torsional movement of sleeves 58d relative to shaft elements 58c about a transverse horizontal axis by the torsional give in the rubber. Therefore, these also act as arm pivots and allow 15 to 20 degrees of rotation by this torsional stress on the rubber while assuring that the arm will return to its previous position after the stressing force has been removed.

A pair of arm stop means are provided on the support member 60 spaced fore and aft, or on opposite sides, of this pivot. The rear one takes the form of the cross tube 62 common to all of the arms. The forward stop is formed by generally parallel plates 80, 80 in Figs. 3 and 4 each secured at its right end to cross tube 62 and welded to cross shaft 64. Stop bar 81 is welded to and extends beyond the distal ends of these plates 80.

The shoe may in turn occupy three different positions by changing the length of the cylinder-piston units 78, 79. First, the position in vibrating contact with the material shown as a solid line position in Fig. 3. Here, arm 58 is horizontal and clearance (about ¾ of an inch) exists between the arm portions and the bottom of the cross tube 62 and the top of the stop bar 81 to allow for ordinary movement of the shoe 20 during vibration and over and into bumps and hollows. Second, a shoe sledding position. If cross tube 62 is raised or lowered from the solid line position in Fig. 3 (but with the clearance between the two stops and the arm not quite closing in the raised position) the arm and shoe will be given a slight tilting action fore or aft about the transverse axis of the vehicle since the pivot on the right end of the arm within sleeve elements 58d is raised or lowered. This position can be used to sled the shoes over soft material and out of holes, whether going backward or forward, and the upwardly beveled bottom face ends on sole plate 27 in Fig. 3 make sledding easier. However, tilting is not generally required under average conditions. Third, a shoe lifted position shown in dot-dash line in Fig. 3 out of material contact. As the tube 62 is raised, the tube 62 and stop bar 81 engage the arms 58 and all of the shoes in the machine in the solid line position of Fig. 2 are simultaneously raised to any desired height.

As will be later more apparent, the extreme "down position" of the cross tube also performs the function of lifting the folded end shoes so that they may be chained up or secured in their stowed position with no manual effort.

Although a single stop means may be used, the double stop means provided by cross tube 62 and stop bar 81 in Fig. 3 is preferred since the stop contact with the arms on opposite sides of the pivots relieves the rubber bushings 65 within sleeve elements 58d of carrying the load of the shoes 20. This prevents permanent set of the rubber if the machine is stored with the shoes raised and prevents overstressing of the rubber when the machine is driven on the highway. The rubber can also be softer for better isolation of vibration if it is not required to sustain the weight of the shoes.

The illustrated construction permits any individual shoe in Fig. 2 to be easily removed for repair puroposes or different operating conditions by merely removing two or more of the nuts 67.

Although any suitable type pivot means with a generally horizontal transverse axis may be used between the sleeve and shaft elements 58d, 64c, the illustrated one is preferred for other reasons in addition to those already mentioned. Some prior art constructions have used bushing formed by a metal cylinder rotatably mounted about a shaft element (corresponding to shaft element 64c) with an annular rubber dampener bonded to and surrounding the metal cylinder and located in the bore of a sleeve element (corresponding to sleeve element 58d) so that both are located between said elements. Then, the shaft element and cylinder provide the pivot while the rubber provides the vibration dampening action. However, this metal pivot rapidly wears under vibration, is difficult to replace, and is an expensive construction. The vibration, especially that traveling along the length of the arm, quickly pounds the lubricant out of the space between the metal sleeve and the shaft and rapid wear occurs. In the present construction, no lubrication is necessary and only the rubber bushings 65 need be replaced instead of the whole rubber-metal pivot assembly.

Figure 5:
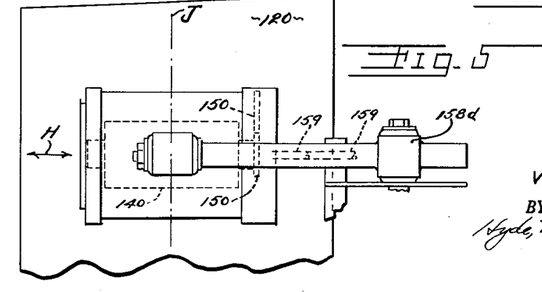
Fig. 5 is a modified form of vibratable shoe and mounting arm therefor adapted to be used on the vehicle disclosed in Fig. 1.

Any suitable type vibratable shoe may be used in the construction shown in Figs. 3 and 4 and not only shoe 20. Although the latter is the preferred construction, another form of vibratable shoe 120 is shown in Fig. 5.

In any type vibratable shoe and mounting arm or carrier therefor, it is desirable to minimize vibration imparted to the propelling vehicle along the length of the arm and to minimize the force of translation on the pivotal mounting of the arm to its supporting member. Having the shoe vibration occur perpendicular to the arm length reduces the force along the length of the arm. This force of translation at the pivot can especially cause trouble if the pivot needs lubrication since it will pound the lubricant out thereof; it will also needlessly vibrate the vehicle frame. The vibratable shoe 120, similar to shoe 20 with corresponding reference numerals of the 100 series used in Fig. 5 whenever possible, has a fluid pressure driven gear motor having gears 150, 150 with one adapted to drive a vibrator having a single, unbalanced mass or rotor 140 rotatable about an axis extending in the direction of vehicle travel, indicated by line H, with this construction being generally similar to the construction of shoe 20 in Fig. 6 except for the use of only one vibrator rotor 140 and suitable modification in the gear construction of the fluid motor. However, this single unbalanced mass 140 causes circular vibration in plane J extending perpendicular to the ground and to the supporting arm 158. The opposite ends of the arm 158 are secured by joints similar to those found on arm portions 58a or a suitable universal joint means within sleeve element 158d for securement to the supporting frame so that the transverse pivotal axis thereof extending perpendicular to the arm will permit raising and lowering of the shoe in the same manner as that shown in Fig. 3. The rubber bushing 65 will permit sufficient universal action to serve as the pivot apex of the cone generated by the arm 158 during the circular vibration of shoe 120. Since the vibration takes place in plane J, substantially no vibration component is forced along the length of the arm 158 and flexible fluid lines 159, 159 of the vibrator driving means may extend generally parallel to the arm 158 between the shoe 120 and the support vehicle having a suitable power source. Hence, the flexible lines are also not stressed since they are oriented generally parallel to arm 158. This would permit the vibrator rotor 140 to be driven by a fluid motor, an electric motor in place thereof, or a flexible shaft extending from the power source on the vehicle since the flexible lines can take the form of fluid conduits, electric power lines, or a flexible shaft. Note that the angle of rotation of rotors 40 in Fig. 6 is perpendicular to the axis of rotation of rotor 140 in Fig. 5 but the shoe vibration vertically along line A in Fig. 8 is also perpendicular to arm 58.

Further reduction in force of translation at the pivot point is also obtained by having the line of vibration or the line of impact of the material on the shoe, and preferably both of these lines, extend through the center of percussion of the arm and shoe about its pivotal mounting when the arm and shoe are connected together substantially rigidly to move as a unit, as in the illustrated construction. Even if the arm and shoe are pivoted together, the extremely small oscillation possible about the pivot (due to the large masses and high frequency) gives a very similar action. Although the principles mentioned about the center of percussion apply equally well to any vibratable shoe, the discussion will be restricted to the two mass vibrator constructions in Figs. 3 and 8.

The center of percussion $K_1$ is defined as that point at which a compound pendulum can be struck without causing jar to the pivotal mounting thereof since the only tendency produced will be to rotate the pendulum about its pivot. The center of percussion $K_1$ about a pivot is a distance L in Fig. 3 from the pivot wherein $$L = \frac{I}{Mh}$$

wherein I is the moment of inertia of the mass M about the pivot axis within sleeved elements 58d, h is the distance from the pivot to the center of gravity $N_1$ of the mass M, and M is the mass of the arm and shoe pivotally supported on the pivot formed by sleeve elements 58d.

The line of vibration A in Figs. 3 and 8 extends through the center of the material contacting sole plate face 27a in Figs. 3 and 8. When this line of vibration A acts through the center of percussion $K_1$, the translation force on the pivot will be minimized.

The integrated impact of the material on the bottom of the sole plate face 27a acts along impact line P. When force P is through the center of percussion $K_1$, the force of translation on the pivot will likewise be minimized. When the material being compacted is generally uniform smooth material, the line of impact will remain in the same location, and in the present design, will be exerted against the center of the sole plate face 27a.

If either of these lines A or P extend through the center of percussion $K_1$, the results will be improved. However, if they coincide or correspond, there will be no force of translation at the pivot within sleeve element 58d. However, rocks, hardness variations and unevenness in height of material may momentarily move the line of impact to a different location on this face to cause a force of translation at the pivot so that dampening will be required there. Of course, if the shoe is heavy enough so it never gets off the material being compacted, then the line of impact P is not so important.

Suitable weights must be added to each shoe plate to obtain the desired location of the center of percussion $K_1$. To make the shoe symmetrical about the center line extending in the direction of travel, side weight 83 in Fig. 4 is secured to the sole plate 27 opposite fluid motor 22 to counterbalance it so as to locate the center of gravity $N_1$ equidistant from the arm portions 58a, 58a. Another weight 84 is secured to sole plate 27 on the pivot side of the vibrator to shift the center of gravity and center of percussion from their normal locations $N_2$ and $K_2$ on the shoe backwardly to the desired locations indicated at $N_1$ and $K_1$ respectively.

Although the multiplicity of shoes and the supporting structure therefor may be secured to any suitable supporting frame structure by pivot pins 75 and pivotal connection at the upper ends of cylinders 78 in Fig. 3, it is specifically disclosed in Figs. 1 and 2 as secured to a frame 70 of a vehicle for vibration compacting material over which it travels because many advantages are obtained in the resulting construction. The vehicle includes frame 70 having a rolling support means 85 at the front and another rolling support means 86 at the rear with each having a large ground material surface contact to provide good floatation and steering of the vehicle. Although this rolling support means may take any suitable form, including an endless crawler track, etc., each is specifically disclosed herein as a pair of wheels connected to a common axle.

The front wheels are manually steerable by steering wheel 87 through a steering column 87a and any suitable conventional wheel steering mechanism.

A vehicle driving motor 89 has its weight located over the rear wheels 86 to insure good traction even when the vibratable shoes 20 are in ground contact; this motor 89 is connected through a suitable transmission to drive the rear wheels 86. Since the vehicle is generally driven in the forward direction over fresh material during the first compaction pass, the front end of the vehicle is made especially light and the weight of the motor 89 on the rear wheels 86 passes over only after the material has been compacted by shoes 20.

A plurality of vibratable shoes 20 are arranged in a row crosswise or transverse to the direction of vehicle travel, carried by the frame 70, located below the frame and between the wheels 85, 86, and adapted to slide over and compact material during vehicle travel. The plurality gives more intimate contact with the material than a single shoe of this overall width.

This shoe location has many advantages over the prior art wherein the shoes are mounted in the front of the front wheels 85 and a counterweight is supported by the frame behind the rear wheels 86 to counterbalance the tendency of the vehicle to rear up forwardly around the front axle when the shoes are lifted. In the present construction, vibratable shoes 20 are less liable to damage from collision since they are located between the front and rear wheels 85, 86. The longitudinal shift in the center of gravity of the vehicle when the shoes 20 are raised into the dot-dash line position or lowered into ground contact in the solid line position is much less. The illustrated machine is designed so that in the raised position the weight of the shoes 20, approximately one-third the total weight of the machine, is equally distributed on the front and rear axles. The illustrated construction also gives better floatation ability on soft ground, gives much safer handling characteristics when driven at transport speed on the highway since it is not nose-heavy, eliminates the need for a rear ballast weight or its equivalent, and reduces the ground pressure of the tires to approximately one-half of the construction with shoes in front and weight in rear.

With the shoes 20 on the ground, the tire loading on the front wheels 85 can be made very light since the motor weight is primarily carried by the rear wheels 86, so that the front wheels do not disturb the uncompacted spread of material. With the shoe in front and weight in rear construction, two disadvantages are obtained. First, the full weight of the structure required to support the shoes is on the front wheels. Second, the front wheel must be small in diameter to keep the shoes as close to the front axle as possible so as to reduce the size of the counterbalance weight at the rear, but then small diameter front wheels will have less flotation ability and will sink more easily into the ground for a given weight thereon. In the design illustrated in the drawings, there is no limitation on the diameter of the wheels 85 and 86.

The operator's seat or carrying station 90 is located on the frame 70 approximately over the shoes to obtain a couple of advantages. First, the operator has better visibility. He can keep the end shoe or shoes lined up with the edge of the spread more easily during travel either forwardly or backwardly. Second, the over-the-shoe position is the location of least dust regardless of the direction of travel since the dust will blow to the rear of the operator when the vehicle is going forwardly and to the front of the operator when it is going rearwardly. This is quite important when vibrating screenings and other dust producing material.

Although the vehicle in Fig. 2 has six shoes across in the solid line position for compacting the full width of a highway lane, it is sometimes desirable to vibrate a path of four or five shoes width instead, and it is necessary for highway travel and transportation between jobs to reduce the overall width to a four-shoe maximum so as to keep it within the legal width limit for highway travel. Means is provided to permit movement of the outer shoes in the solid line position of Fig. 2 generally laterally of the vehicle to within the lateral confines of the vehicle to reduce the lateral dimensions of the vehicle and the material compacted path. In the present construction, the support member 60 is formed in three sections—the center section 60a with a cross tube section 62a and two end sections 60b with cross tube end sections 62b outwardly protruding from opposite ends thereof. The center section 60a is the only one supported by the pivot pins 75 for raising and lowering while the end sections 60b are each pivotally connected to the center section by a hinge 92 in Figs. 1 and 2 to permit swinging the end shoes in a horizontal plane between the outer, solid line position in Fig. 2 (the vibratable position) and an inner, inactive or stowed position shown in dot-dash lines in Fig. 2 to reduce the vibrated path width and overall width of the vehicle. Folding the outer shoes rearwardly makes them easy to stow without interference with either the front wheels 85 or the other vibratable shoes. In Fig. 1, the shoe 20 is shown in solid line position in contact with the ground while the pivot axis Q of the hinge 92 is inclined slightly upwardly and forwardly of the vehicle. However, when the shoes are lifted off of the ground by rotation about pivot pins 75, these hinge axes swing to the vertical so that, when the shoe is cleared of the ground, the shoe may be swung rearwardly to the dot-dash line position in Fig. 2 with minimum effort about this vertical axis by being swung in a horizontal plane.

Coacting locking means are provided between the support member sections 60a, 60b to lock the outer shoes selectively in either of these positions. Here, the outer end of each cross tube 62b carries a locking flange 94 adapted to engage against a locking flange 93 on the central cross tube section 62a and to be bolted thereto by a nut and bolt connection 95 to maintain it in the dot-dash line position. The end shoe is maintained in solid line position by having the hinge leaves 92a, 92b serve as locking flanges suitably held together by the same nut and bolt connection 95.

As an end shoe is swung rearwardly to the dot-dash line position, the fluid that flows thereto is automatically cut off by disengaging two halves of an automatic flow cut-off coupling 98 in Fig. 10 of any suitable design. One typical such coupling is illustrated in the patent entitled "Quick Release Valve Coupling" to J. Wilkinson Patent No. 1,493,306, issued May 6, 1924 wherein axial separation and disengagement of the coupling parts will cause a spring-loaded valve in each to close and axial approach connection of the coupling parts will not only cause these valves to open and remain open to permit fluid flow but also lock the coupling parts together. Hence, the end shoe is permitted to vibrate in solid line position of Fig. 2 and is prevented from vibrating in the dot-dash line or inactive position thereof. If the four center shoes have been vibrating for some time and the fluid is at operating temperature, swinging a cold outer shoe from the dot-dash line position to the solid line position and immediately applying hot fluid thereto will normally cause binding, but the advantages of the gear motor design mentioned heretofore as one of the other features of the invention permits this operation to take place without difficulty.

After the end shoe has been swung to its dot-dash line position in Fig. 2 and clamped therein by nut-bolt connection 95, the center section 60a of the support member 60 is swung counterclockwise around pivot 75 in Fig. 1 past the solid line position by means of the double acting cylinder and piston units 78, 79 so that the stop bar 81 and cross tube section 62b will act upon the arm 58 of the end shoe to lift it up to its stowing or dot-dash line position in Fig. 1 where a chain 100, one connected to each frame member 70a, can serve as a means for detachably connecting it to frame 70 and for supporting it out of material contact. Then, the supporting member section 60a is swung clockwise about pivots 75 until the shoes 20 assume the solid line position in Fig. 1 for vibrating contact with the ground material.

During travel on the highway with its tremendous jolts, the cylinder supports only a portion of the weight of the cross tube and approximately only the weight of two shoes when all shoes are in the dot-dash line positions in Fig. 1. Since the end shoes in the stowed positions in Fig. 1 are located on the opposite sides of transverse pivot axis provided by pins 75 with respect to the four center shoes raised to the carrying position in dot-dash lines in Fig. 1, the rearward shoes approximately counterbalance the weight of two of the four forwardly extending shoes so that the lift cylinders 78 do not have such a great load. Hence, this structure obviates the need of a separate shipping bar of some sort to take the weight of the shoes off the cross tube and lifting cylinders.

The main advantage of this construction is that it permits the vehicle operator, by himself, to swing the outer shoes between the two positions with no more effort than that required to loosen and tighten the nut and bolt connection 95, and does not require detaching the end shoes by two or more men with each detached assembly weighing from 500 to 1000 pounds. Also, detached end shoes are frequently lost or forgotten when laid upon the roadside; it is not necessary for the vehicle operator to return for the detached shoes after the job has been completed since the inactive shoes are always carried on the vehicle.

Figure 9:
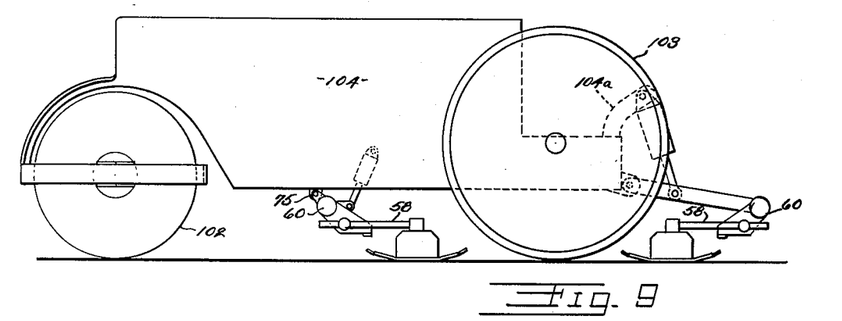
Fig. 9 is a side elevational view of a road roller with the structure of Figs. 3 and 4 secured to the frame thereof.

Another form of vehicle to which the vibratable shoe of Fig. 5 or Fig. 6 may be secured by means of pivots 75 is a conventional roller shown in Fig. 9 having a heavy frame 104 with a driving motor supported on the front and rear rollers 102, 103 respectively. Bracket 104a on the rear of the frame is generally used to support a scarifier attachment but may be used instead to support a shoe in the manner illustrated by an extensible hydraulic cylinder piston unit and pivoted lever. The shoes may be mounted several abreast immediately behind or ahead of the roller 103 in either one or both of the positions shown in Fig. 9. It has been found that having a vibratable shoe immediately adjacent to and in path of movement of one of the heavy rollers gives greater compaction than either of the roller or vibratable shoe alone since there is a coaction between the dead weight of the roller and frame with the vibratable shoe producing a zone of vibration effect on the ground under the roller. Here, the shoe can be located very close to the line of ground contact of the roller 103. The roller may instead take the form of a single roller supporting at least one end of a frame towed by a power driven vehicle.

A fluid flow circuit is illustrated in Fig. 10 and is adapted to not only drive the fluid motors 22 and the shoes 20 but also to carry away heat from the shoe motor and vibrator for dissipation by a cooling radiator on the vehicle frame. In the illustrated construction, fluid such as oil is stored in the reservoir tank 106 to be pulled therefrom through a filter 107 and conduit 108 by a pressure pump 109, through a pressure release valve 110 adapted to return pump flow to tank 106 when the pressure is above a predetermined amount, to a high pressure manifold 112 attached to cross tube 62 in Figs. 3 and 4. This high pressure distributing manifold distributes fluid under pressure to the fluid motors of shoes 20 by means of a plurality of conduit lines 113 (through flow cutoff disconnect couplings 98 for the end shoes or other shoes, if desired) for vibrating the shoes. Conduit lines 114 feed the fluid from five of the six shoes back to the cross tube center section 62a, serving as the low pressure fluid manifold, in which it is partially cooled by the large metal mass and large surface area of the manifold before it is returned by conduit 115 to the tank 106. The flow from the sixth shoe travels by conduit 116 to a junction branching into two parallel flow paths back to the fluid storage tank 106. A flow control valve 117 of any suitable conventional fluid temperature responsive flow controlling design is located at the junction end of the path and selectively controls the flow by a movable valve closure 117a, capable of assuming either of the dotted line positions, so as to permit the fluid to flow directly back to the tank by conduit 118 when its temperature is low enough or to flow through conduit 118a and through heat dissipating radiator 119 on its return path to the fluid storage tank 106 if the fluid temperature indicates to the control valve 117 that cooling is desirable. Note that this radiator 119 is located on the vehicle frame remote from the shoes and the dust created thereby so as to satisfactorily dissipate the heat from the conveying fluid at a convenient location.

Although variations in the flow path would be readily made, the illustrated one has these advantages. Since only a portion of the fluid need be cooled and this will reduce the temperature of the fluid in the tank 106 upon mixing therewith, the flow from all of the shoes 20 need not be directed through the flow control valve 117 but only one shoe thereof. Hence, the valve 117 may be of smaller capacity, cheaper in price and cause less flow pressure loss in the system. Of course, under some conditions, it may be possible to route the returning flow from the one shoe directly through the radiator or heat exchanger 119 and thus eliminate the valve 117 and return line 118.

If the shoes 20 are permitted to continue to vibrate after the vehicle has stopped its forward or rearward movement, this continuous vibration will pound a depression in the ground material and especially when the transmission gears of the vehicle are being shifted. Compaction by a conventional roller of the type illustrated in Fig. 9 also presents this problem. The compacting action of the weight of the roller can in no way be suspended when the machine is stopped or while its gears are being shifted into reverse. The resulting lumps and depressions in the compacted material surface are undesirable. This is most important with plastic materials like soil cement base. However, the present machine has a control means responsive to the driving of the rear wheels 86 for controlling the shoe vibration so that the vibration can occur only when the rear wheels 86 are being driven and the vehicle is moving. In Fig. 10, driving motor or engine 89 drives through a manually disengageable clutch 165, such as one of the conventional friction type, to a common drive unit 166 driving both pump 109 and the drive shaft 168 to the rear wheels 186 through a speed change transmission gear box (the speeds thereof controlled by a shift lever 167 to provide not only a high speed for transportation on the highway and a low forward and reverse speed for compacting but also a plurality of speed change choices for each of these three). Hence, disengagement of clutch 165 to permit shifting of lever 167 in gear box 166 or for stopping the vehicle in Fig. 1 will automatically stop driving pump 109; pump 109 will again start to pump fluid when clutch 165 is again engaged and the vehicle starts traveling either forwardly or in reverse. When traveled over the highway, it is desirable not to be rotating the fluid pressure pump 109 so a manually disengageable clutch, such as the conventional dog-toothed type, is provided at 169 for disengagement at that time.

Figure 11:
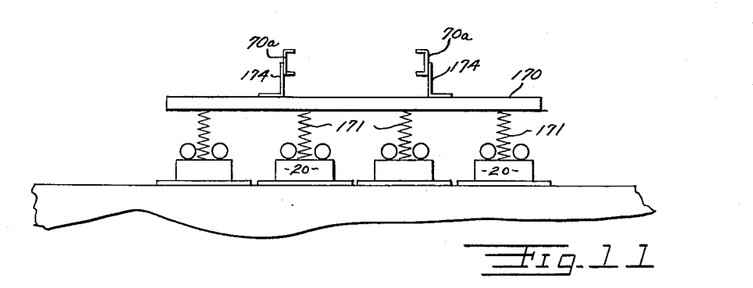
Figure 12:
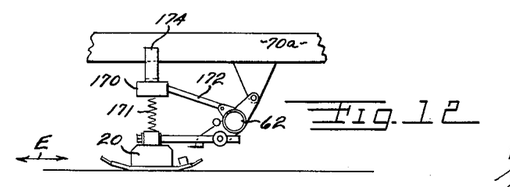
Fig. 12 is a view, extending longitudinally of the vehicle and transverse to the weight in Fig. 11, of the mounting construction of this weight.

A static weight construction of the type illustrated in Figs. 11 and 12 may be added to the plurality of shoes in any of the prior constructions or any other suitable vibratable shoe construction. Here, weight 170 is supported by one or more springs 171 or other suitable resilient means, such as rubber, pneumatic springs, etc. on top of the vibratable shoes 20 to increase the ground contact pressure and thus increase the transfer of vibration to the ground, to keep a shoe from bouncing if it hits a hard resilient surface, but not to dampen or deaden the vibration in any way.

The weight and spring for each shoe must be designed so that they have a substantially different resonant frequency from the frequency of the force imposed thereon by the shoe caused either by the vibrating frequency of the shoe or by impact on the shoes by the material being compacted. The resonant frequency should be preferably less than one-half the shoe vibrating frequency so that substantial amplitude of vibration is not induced to the weight 170 and springs 171.

It has been found that material obtains maximum compaction for a given energy input to the shoes when they are vibrated in a predetermined optimum frequency range. Hence, the shoe vibration frequency must be substantially determined for this consideration.

When a single weight is freely suspended by a spring over a single shoe vibrating in this optimum frequency range, it is practically impossible to make the resonant frequency of the spring and weight enough different from the shoe vibration so that a violent resonant vibration of substantial amplitude is not forced on the weight. To avoid this situation, the weight could be increased in size but then it becomes ponderous or exerts so much pressure on the shoe that it can't slide over the ground; the spring could be made softer but then it would become exceedingly bulky or has a very short wear life; or the shoe vibration frequently could be increased but then it would not be vibrating at the optimum frequency.

However, there are two solutions to this problem.

First, if the weight 170 is substantially freely supported by only the springs, if the weight extends over two or more shoes, and if the shoes are driven non-synchronously, the resonant condition will not occur. Then for four shoes, the total mass of weight 170 may be four times as much as for a single weight over a single shoe. The weight 170 may be freely supported either by arms 172, pivotally connected at opposite ends to the cross tube section 62a and the weight 170, or by lost motion connectors or resilient members 174 with the frame members 70a, 70a', or both. Then, each shoe 20 will impose a separate force by its vertical component of movement through its spring upon the weight 170. If these shoes are driven non-synchronously (either at a different frequency or in a different phase relationship or both), the resonant condition will not occur. They will not generally run at the same frequency because the component parts of each shoe have a slightly different frictional fit, fluid displacement and manner of vibration and the fluid paths have slightly different pressure drops. When accidentally operating at the same frequency, they will probably be in a different phase relationship, so that the upward forces by the shoes will be exerted at different times so that the net result is similar to having a frequency imposed upon the weight of approximately four times the vibrating frequency of the shoes when four shoes are used. In other words, a single shoe in Fig. 11 is attempting to force a vibration on a weight 170, which is four times as great as it would be with four separate weights. When the shoes are operating at only a slightly different frequency, the resultant force acting on the weight will have a transient effect. For example, in a two shoe situation, the maximum amplitude will be imposed on the weight with a frequency equal to the difference between the frequencies.

Second, when the weight 170 is rigidly connected to the frame by connections 174, now rigidly formed, the whole vehicle frame 70 acts as part of the weight to make the weight large and have a substantially lower resonant frequency. The springs 171 then can be made softer since wheels 85, 86 support part of the vehicle weight. Therefore, the resonant frequency problem is not encountered with this construction. However, the springs 171 have to be sufficiently stiff to exert substantial downward force on their associated shoes 20 but not stiff enough to reduce the driving friction on the rear wheels 86 below the vehicle retarding friction of the shoes 20 in vibrating contact with the material. It should be apparent that this construction will avoid the resonant frequency problem even when either all shoes are being driven synchronously or the weight of weight 170 and frame 70 are both on only one shoe being used.

Of course, a combination of these two constructions, as shown in Figs. 11 and 12 with the weights secured to the frame and all shoes driven non-synchronously provides a design superior to either.

When static weight 170 is used over all six shoes instead of only the center four, the weight may be made in three sections with hinges therebetween, similar to cross tube 62 or the end sections may be detachable.

When a static weight is used over the shoes, all of the previously mentioned advantages of the Fig. 1 construction concerned with weight transfer between wheels 85 and 86 and shoes 20 during raising and lowering of the shoes are accentuated due to the weight involved. The weight can also be used as a transverse structural member (beam) to lift the shoes in lieu of the cross tube arrangement when the weight is movable vertically on the frame and lost motion connections (such as flexible members, chains, etc.) connect the shoes thereto.

Various changes in details and arrangement of the parts can be made by one skilled in the art without departing from either the spirit of this invention or the scope of the appended claims.

What I claim is:

1. A shoe for vibrating material, comprising a shoe frame including a motor housing, two unbalanced masses each rotatably mounted on said frame and adapted to rotate synchronously but in opposite directions, and a fluid actuated gear type driving motor with two meshing gears rotatably mounted in said motor housing and with each gear thereof detachably operatively connected directly and coaxially to one of said masses so that the gears rotatively drive said masses synchronously but in opposite directions, said housing having high and low pressure ports on opposite sides of the mesh of said gears with said gears being rotatably supported in said housing to permit carrying fluid from one port to the other in the pockets between the gear teeth.

2. A shoe adapted to slide over material and compact it by vibration, comprising a shoe frame including a shoe plate adapted to rest upon the material to be compacted and including a motor housing, two unbalanced masses each rotatably mounted on said frame and adapted to rotate synchronously but in opposite directions, and a fluid actuated gear type driving motor with two meshing gears rotatably mounted in said motor housing and with each gear thereof operatively connected to rotate one of said masses so that the gears drive said masses synchronously but in opposite directions, said housing having for each gear a recess fitting snugly around the sides and outer ends of the gear teeth over a portion of the gear circumference, said housing having high and low pressure ports on opposite sides of the mesh of said gears in fluid communication with both recesses so that each gear is driven by carrying fluid from one port to the other in the pockets between the gear teeth through its recess.

3. The combination, as set forth in claim 2, with a roller associated with said shoe in contact with said material, and means operatively connecting the shoe and roller so that the shoe is held close to the material and is constantly urged into material contact by its own weight and so that the dead weight of the roller combines with the forced vibration of the shoe to give substantial material compaction.

4. A shoe as set forth in claim 2, with the two gears operatively connected to said masses in axially spaced relationship.

5. A shoe, as set forth in claim 4, with a bearing axially interposed between each gear and its associated mass to rotatably support them in said shoe frame.

6. A shoe, as set forth in claim 2, with said gears being made of relatively soft bearing like material.

7. A shoe, as set forth in claim 2, with said gears being of approximately equal size, said masses being of approximately equal size, at least one of said gears being made of a material and being dimensioned to have a tooth strength less than one-half the total driving load for driving both said masses.

8. A shoe, as set forth in claim 2, with said gears being formed of material having a higher coefficient of thermal expansion than said motor housing and fitted in said recesses to prevent appreciable leakage therepast when rotating under normal operating conditions so as to permit a start with a cold motor and fluid at normal operating temperature.

9. A shoe, as set forth in claim 2, with said gears having a pressure angle of approximately 30 degrees to minimize tooth size and maximize the volume of the pockets between the gear teeth to maximize the fluid transfer for a given gear size.

10. A shoe, as set forth in claim 2, with said gears having a contact ratio of approximately one to minimize the compression of fluid in the space between the contact points on the meshing gear teeth and to minimize shaft bearing load while still permitting smooth rotation.

11. In combination, a plurality of shoes adapted to slide over material and compact it by vibration and driven by a single fluid pressure source, each shoe comprising a housing, two unbalanced equal masses each rotatably mounted in a first chamber of said housing and adapted to rotate synchronously but in opposite directions, a fluid actuated gear type driving motor with two equal sized meshing gears rotatably mounted in a second chamber of said housing and with each gear thereof operatively connected to rotate one of said masses, said operative connection including two parallel shafts with each having secured thereto one of said gears and one of said unbalanced masses so that the gears drive said masses synchronously but in opposite directions, each shaft being supported in said housing by only two only radially loadable bearings located at opposite sides of the associated unbalanced mass and with the gear adjacent one of said bearings, said second chamber having inlet high and outlet low pressure ports straddling the mesh of said gears with said gears being rotatably supported in said housing to permit carrying fluid from one port to the other in the pockets between the gear teeth, said gears being made of relatively soft bearing-like material and being dimensioned to have a tooth strength less than one-half the total load of rotating both said masses, said gears being formed of material having a higher coefficient of thermal expansion than the surrounding second chamber and fitted to prevent appreciable leakage therepast when rotating under normal operating conditions so as to permit a start with a cold motor and fluid at normal operating temperature, said gears having a pressure angle of approximately 30° to minimize tooth size and maximize the volume of the pockets therebetween to maximize the fluid transfer for a given gear size while not increasing the shaft bearing load, said gears having a contact ratio of approximately one to minimize the compression of fluid in the space between the contact points on the meshing gear teeth and to minimize shaft bearing load while still permitting smooth rotation of the shafts as the masses rotate at constant speed, said housing including a single one-piece end cap for closing the outer end of the second housing chamber and closing the pockets on the outer side of the gears, said gears being rigidly secured to their shafts for locating the masses axially and for absorbing end thrust, said housing completely enclosing said fluid motor and rotatable unbalanced masses against fluid leakage or dirt entry except by said ports, said housing including a fluid passageway from the inlet port to said first chamber for cooling purposes and when the fluid is oil for lubricating purposes and including a vent means in said housing from said first chamber to said outlet port, the relatively loose fit of the gears in said housing being part of said passageway and permitting substantial leakage of fluid past the gears when cold to assure adequate fluid in the first chamber during starting, each of said unbalanced masses including a weight being located within a cylinder carried coaxially on its associated shaft; means in the fluid flow line located remote from and connected to said shoes by the fluid flow conduit therebetween for dissipating the heat added during flow through the shoes and carried away by the fluid; and means operatively connected to at least some of the shoes for cutting off or admitting fluid to one of said shoes while the other shoe is being driven by said fluid whereby said one shoe while inoperative and cold may be immediately driven by fluid supplied thereto at operating temperature.

12. In combination, a plurality of shoes for vibrating material; means operatively connecting said shoes together; each shoe comprising a shoe frame including a motor housing, a vibrator mounted on said frame, and a fluid actuated gear type driving motor with two meshing gears rotatably mounted in said motor housing and operatively connected to drive said vibrator, said housing having high and low pressure ports with said gears being rotatably supported in said housing to permit carrying fluid from one port to the other in the pockets between the gear teeth; said gears in one of said shoes being formed of material having a higher coefficient of thermal expansion than said motor housing and fitted to prevent appreciable leakage therepast when rotating under normal operating conditions so as to permit a start with a cold motor and fluid at normal operating temperature; and means operatively connected to at least some of said shoes for cutting off or admitting fluid to said one shoe while the other shoe is being driven by said fluid whereby said one shoe while inoperative and cold may be immediately driven by fluid supplied thereto at operating temperature of the other shoes.

13. A shoe for vibrating material, comprising a housing, a vibrator mounted in a first chamber of said housing, and a lubricating fluid actuated gear type driving motor with two meshing gears rotatably mounted in a second chamber of said housing and operatively connected to drive said vibrator, said housing having inlet high and outlet low pressure ports with said gears being rotatably supported in said housing to permit carrying fluid from one port to the other in the pockets between the gear teeth, said gears being formed of material having a higher coefficient of thermal expansion than said housing and fitted to prevent appreciable leakage therepast when rotating under normal operating conditions so as to permit a start with a cold motor and fluid at normal operating temperature, said housing completely enclosing said fluid motor and vibrator against fluid leakage or dirt entry, said housing including a fluid passageway from one of said ports to said first chamber for cooling purposes and when the fluid is oil for lubricating purposes, the relatively loose fit of the gears in said housing being part of said passageway and permitting substantial leakage of fluid past the gears when cold to assure adequate lubricating fluid in the chamber during starting.

14. In combination, a shoe adapted to slide over material and compact it by vibration, said shoe comprising a shoe frame, a vibrator mounted on said frame, and a fluid actuated driving motor on said frame operatively connected to drive said vibrator, a fluid tank and a fluid pump and a fluid cooling means located remote from said shoe, fluid flow conduit means operatively connecting said tank, pump, fluid motor and cooling means whereby said pump pumps the fluid under pressure from said tank to said motor and back to the tank with said cooling means at least partially dissipating the heat when necessary from at least part of the fluid, said conduit means including a section with two parallel flow paths, said cooling means being in one of said flow paths, and fluid temperature responsive flow controlling means controlling the flow between said paths so that the cooling means is effective to cool the fluid coming from said shoe when fluid temperature exceeds a predetermined amount.

15. In combination, a plurality of shoes adapted to slide over material and compact it by vibration, each shoe comprising a shoe frame, a vibrator mounted on said frame, and a fluid actuated driving motor on said frame operatively connected to drive said vibrator, a fluid tank and a fluid pump and a fluid cooling means located remote from said shoes, fluid flow conduit means operatively connecting said tank, pump, fluid motors and cooling means whereby said pump pumps the fluid under pressure from said tank to said motors and back to the tank with said cooling means at least partially dissipating the heat when necessary from at least part of the fluid, said conduit means including a section having parallel flow paths back to said tank from at least one of said shoe motors, said cooling means being in one of said flow paths, and fluid temperature responsive flow controlling means at a junction end of said paths for selectively controlling the flow through the paths so that the cooling means is effective to cool the fluid coming from said shoe when fluid temperature exceeds a predetermined amount whereby the fluid in said tank for all said shoes is cooled.

16. A vibration-type material compacting machine, comprising a plurality of shoes adapted to slide over material and compact it by vibration, each shoe comprising a shoe frame, comprising a vibrator mounted on said frame, and comprising a fluid actuated driving motor on said shoe operatively connected to drive said vibrator so that each shoe has a separate vibrator and motor, a fluid tank and a fluid pump and a fluid cooling means located remote from said shoes, and fluid flow conduit means operatively connecting said tank, pump, fluid motors and cooling means whereby said pump pumps the fluid under pressure from said tank to said motors and back to the tank with said cooling means at least partially dissipating the heat when necessary from at least part of the fluid, said fluid flow conduit means including one flow path from at least one of said shoes through said cooling means to said tank for metering flow through said cooling means and including another flow path from the remainder of said shoes back to said tank and by-passing said cooling means, so that the flow from said one flow path meters the flow through said cooling means and mixes in said tank to cool the uncooled flow from said other flow path so that the cooling means is of minimum flow capacity.

17. In combination, a plurality of shoes adapted to slide over material and compact it by vibration, each shoe comprising a shoe frame, a vibrator mounted on said frame, and a fluid actuated driving motor on said frame operatively connected to drive said vibrator, a fluid tank and a fluid pump and a fluid cooling means located remote from said shoes, fluid flow conduit means operatively connecting said tank, pump, fluid motors and cooling means whereby said pump pumps the fluid under pressure from said tank to said motors and back to the tank with said cooling means at least partially dissipating the heat when necessary from at least part of the fluid, said conduit means including a section having parallel flow paths back to said tank from at least one of said shoe motors, said cooling means being in one of said flow paths, and fluid temperature responsive flow controlling means at a junction end of said paths for selectively controlling the flow through the paths so that the cooling means is effective when fluid temperature exceeds a predetermined amount, the fluid from the remainder of said shoe motors flowing directly back to said tank without cooling whereby the fluid in said tank for all said shoes is cooled.

18. A vibratable shoe and support structure for said shoe adapted to be secured to a vehicle frame, comprising a vibratable shoe, a shoe support member adapted to be connected for relative upward movement to said frame, a shoe carrier operatively connected to said shoe, pivot means between said carrier and member spaced from its associated shoe and having a generally horizontal axis, and stop means on said member spaced from said pivot means and adapted to be disengaged from said carrier and free of contact therewith during shoe vibrating contact with the material so as not to interfere with the vibrating action but engaged with the carrier during substantial upward movement of the member relative to the frame so as to lift said shoe and to limit the pivotal movement at said pivot means.

19. The combination, as set forth in claim 18, with said shoe including a shoe plate adapted to rest upon the material to be compacted and a motor driven vibrator secured to said shoe plate and imposing a forced sinusoidal vibration on said shoe, a roller associated with said shoe in contact with said material, and means operatively connecting the shoe and roller so that the shoe is held close to the material and is constantly urged into material contact by its own weight and so that the dead weight of the roller combines with the forced vibration of the shoe to give substantial material compaction.

20. A vibratable shoe and support structure for said shoe, comprising a vibratable shoe, a shoe support member, an arm operatively connected to said shoe, pivot means between said arm and member spaced along said arm from its associated shoe and having a generally horizontal axis, said pivot means including coacting shaft and sleeve elements with one element carried by the arm and the other by the member and including a rubber dampener bushing having opposite surfaces fixed respectively relative to said elements for permitting limited pivotal movement therebetween by torsion of the rubber and for dampening the shoe vibration, and stop means for limiting the pivotal movement of said pivot means.

21. A vibratable shoe and support structure for said shoe, comprising a vibratable shoe, a shoe support member, an arm operatively connected to said shoe, pivot means between said arm and member spaced along said arm from its associated shoe and having a generally horizontal axis, said pivot means including coacting shaft and sleeve elements with one element carried by the arm and the other by the member and including a rubber dampener located between the elements for dampening the shoe vibration, and a pair of stop means on said member located on opposite sides of said pivot means and adapted to be disengaged from said arm during shoe vibrating contact with the material so as not to interfere with the vibrating action but adapted to engage the arm on opposite sides of said pivot means during substantial upward movement of the member so as to lift said shoe and to limit the pivotal movement at said pivot means and to reduce stress on said rubber dampener.

22. A vibratable shoe and support structure for said shoe, comprising a vibratable shoe, a shoe support member, an arm operatively connected to said shoe, pivot means between said arm and member spaced along said arm from its associated shoe and having a generally horizontal axis, said pivot means including coacting shaft and sleeve elements with one element carried by the arm and the other by the member and including a rubber dampener bushing having opposite surfaces fixed respectively relative to said elements for permitting limited pivotal movement therebetween by torsion of the rubber and located between the elements for dampening the shoe vibration, and a pair of stop means on said member located on opposite sides of said pivot means and adapted to be disengaged from said arm during shoe vibrating contact with the material so as not to interfere with the vibrating action but adapted to engage the arm on opposite sides of said pivot means during substantial upward movement of the member so as to lift said shoe and to limit the pivotal movement at said pivot means and to reduce stress on said rubber dampener.

23. A vibratable shoe and support structure for said shoe adapted to be secured to a vehicle frame, comprising a vibratable shoe, a shoe support member adapted to be connected for relative movement to said frame, a shoe carrier operatively connected to said shoe, pivot means between said carrier and member spaced from its associated shoe and having a generally horizontal axis, an extensible link operatively connected to said member and adapted to be operatively connected to said frame at opposite ends for raising and lowering said member, and stop means on said member spaced from said pivot means disengaged from said carrier and free of contact therewith during shoe vibrating contact with the material so as not to interfere with the vibrating action but engaged with the carrier during substantial upward movement of the member relative to the frame so as to lift said shoe and to limit the pivotal movement at said pivot means.

24. A plurality of vibratable shoes and support structure for said shoes adapted to be secured to a vehicle frame, comprising a plurality of vibratable shoes, a shoe support member including a cross piece extendable generally transverse to the direction of vehicle travel, said member adapted to be connected for relative movement to said frame, means for supporting each shoe individually from said member, said supporting means for each shoe including an arm extending along the direction of vehicle travel and operatively connected to its associated shoe, and including pivot means between said arm and member spaced from its associated shoe and having a generally horizontal transverse axis, and stop means on said member spaced from said pivot means disengaged from said arms and free of contact therewith during shoe vibrating contact with the material so as not to interfere with the vibrating action but engaged with the arms during substantial upward movement of the member relative to the frame so as to lift said shoes and to limit the pivotal movement at said pivot means, said cross piece providing said stop means common to all of said arms.

25. A plurality of vibratable shoes and support structure for said shoes adapted to be secured to a vehicle frame, comprising a plurality of vibratable shoes with each being vibrated by a fluid motor thereon, a shoe support member including a cross tube extending generally transverse to the direction of vehicle travel, said member adapted to be connected to said frame, means supporting each shoe individually from said member, said tube serving as a fluid manifold in the fluid flow circuit, and a fluid flow line connecting in fluid communication each shoe and said cross tube.

26. In combination, a vehicle having a frame, a vibratable shoe, a shoe support member pivotally connected for relative movement about a horizontal transverse axis to said frame, an arm extending along the path of vehicle travel and operatively connected substantially rigid thereto by a resilient dampener coupling means to resist the couple caused by material contact by said shoe during vehicle travel, pivot means between said arm and member spaced along said arm from its associated shoe and having a generally horizontal transverse axis, said pivot means including coacting shaft and sleeve elements with one element carried by the arm and the other by the member and including a rubber dampener bushing having opposite surfaces fixed respectively relative to said elements for permitting limited pivotal movement therebetween by torsion of the rubber and located between the elements for dampening the shoe vibration, and a pair of stop means on said member located on opposite sides of said pivot means and adapted to be disengaged from said arm during shoe vibrating contact with the material so as not to interfere with the vibrating action but adapted to engage the arm on opposite sides of said pivot means during substantial upward movement of the member relative to the frame about the pivotal connection therewith so as to lift said shoe and to limit the pivotal movement at said pivot means and to reduce stress on said rubber dampener and adapted to tilt the shoe up or down for sledding during vehicle travel by a smaller up or down movement of the member.

27. A plurality of vibratable shoes and support structure for said shoes adapted to be secured to a vehicle frame, comprising a plurality of vibratable shoes with each being vibrated by a fluid motor thereon, a shoe support member including a cross tube adapted to extend generally transverse to the direction of vehicle travel and adapted to be connected for relative upward movement to said frame, a shoe carrier operatively connected to each shoe, pivot means operatively connecting each carrier and said member spaced from its associated shoe and having a generally horizontal axis, said cross tube being spaced from each of said pivot means so as to be disengaged from said carrier during shoe vibrating contact with the material so as not to interfere with the vibrating action but with said cross tube engageable with each carrier during substantial upward movement of the member relative to the frame so as to lift all of said shoes and to limit the pivotal movement at said pivot means, said tube serving as a fluid manifold in the fluid flow circuit, and a fluid flow line connecting each shoe and said cross tube in fluid communication.

28. A vibratable shoe for compacting material and support structure for said shoe adapted to be secured to a vehicle frame, comprising a slidable vibratable shoe slidable over a surface of said material, a shoe carrier operatively connected substantially rigidly to said shoe for preventing relative movement about an axis extending generally transverse to the direction of shoe travel, pivot means operatively connected to the shoe carrier a distance spaced along the path of vehicle travel from the center of the shoe to provide pivotal movement of the shoe and carrier relative to said vehicle frame about an axis extending generally parallel to the surface of said material, means for connecting said pivot means to said vehicle frame for moving said pivot means in a direction approximately perpendicular to said axis for tilting the shoe about said axis up to a tilted up position or down to a tilted down position from a normal material contacting position for sledding during vehicle travel, and means for vibrating the shoe in material contact as it slides over the material in each of these positions.

29. A shoe, as set forth in claim 28, with said shoe carrier being an arm extending generally in the direction of vehicle travel and operatively connected substantially rigidly to said shoe by a resilient dampener coupling means to resist the couple caused by material contact on said shoe during vehicle travel and to minimize vibration transmission.

30. A vibratable shoe and support structure for said shoe, comprising a vibratable shoe adapted to travel on and to compact material, a shoe support member, an arm extending generally horizontally and generally in the direction of travel when said shoe is in engagement with said material, first means operatively connecting one portion of said arm to said shoe for preventing substantial relative pivotal movement around one axis of said arm and shoe with this axis extending generally horizontally and generally transversely to the direction of shoe travel so that substantial tilting of said arm relative to said shoe is minimized by preventing substantial pivotal movement about said one axis, and second means operatively connecting another portion of said arm to said member for preventing substantial relative pivotal movement around another axis between said member and arm with this other axis extending generally vertically so that lateral sway of said shoe is minimized by preventing substantial pivotal movement about said other axis.

31. The combination, as set forth in claim 30, with both of said means being vibration dampeners.

32. The combination, as set forth in claim 30, with said first means including pivot means pivotally connecting said one arm portion and said shoe for pivotal movement about a third axis extending approximately perpendicular to said one axis, and said second means including pivot means pivotally connecting said other arm portion and said member for pivotal movement about a fourth axis extending approximately perpendicular to said other axis.

33. A plurality of vibratable shoes and support structure for said shoes secured to a vehicle frame, comprising two vibratable shoes, a shoe support member extendable generally transverse to the direction of vehicle travel and including two interconnected sections with one connected to said frame and the other section protrudable outwardly beyond said first section in an outer position to increase the width of path vibrated by said shoes during vehicle travel, means supporting one shoe individually from each section of said member with each shoe and its associated section spaced apart in the direction of travel, and a hinge means operatively connecting said sections with a pivot axis locatable generally vertically so that the other section is swingable in a horizontal plane between said outer position transversely aligned with said one section and an inner position to reduce the vibrated path width by swinging the shoe on said other section to the opposite side of said sections along said direction of travel.

34. The combination, as set forth in claim 33, with said hinge means and members constructed to swing said other section through an arc of approximately 180 degrees between said positions.

35. The combination, as set forth in claim 33, with said pivot axis located between said section along the direction of travel in said inner position.

36. In combination, a vehicle having a frame, two vibratable shoes, a shoe support member extending generally transverse to the direction of vehicle travel, said member including two interconnected sections with one being connected to said frame and the other section protrudable outwardly beyond said first section in an outer position to increase the width of path vibrated by said shoes during vehicle travel, means supporting one shoe individually from each section of said member, a hinge means operatively connecting said sections with a pivot axis locatable generally vertically to permit swinging in a horizontal plane of the other section between said outer position transversely aligned with said one section and an inner stowed position on the opposite side of the pivotal connection of said member to said frame to reduce the vibrated path width, means detachably connecting the shoe of said other section to the frame in the inner position for supporting it out of material contact during material vibrating contact by the shoe of said one section, said supporting means for each shoe including an arm extending along the direction of vehicle travel and operatively connected to its shoe and including pivot means between at least one of said arms and member spaced along said arm from its associated shoe and having a generally horizontal transverse axis, and means associated with the shoe of the other section for retaining the shoe of the other section in the stowed position out of material contact during material contact by the shoe of said one section.

37. A plurality of vibratable shoes and support structure for said shoes adapted to be secured to a vehicle frame, comprising two vibratable shoes, a shoe support member extendable generally transverse to the direction of vehicle travel and including two interconnected sections with one being adapted to be connected to said frame and the other section protrudable outwardly beyond said first section in an outer position to increase the width of path vibrated by said shoes during vehicle travel, means supporting one shoe individually from each section of said member, a hinge means operatively connecting said sections to permit swinging of the other section between said outer position transversely aligned with said one section and an inner position to reduce the vibrated path width, and means associated with the shoe of the other section for raising at least the shoe of the other section off the ground with the hinge pivot axis vertically aligned to permit easy swinging between said positions.

38. In combination, a vehicle having a frame, two vibratable shoes, a shoe support member extending generally transverse to the direction of vehicle travel, said member including two interconnected sections with one being pivotally connected for relative movement about a horizontal transverse axis to said frame for raising and lowering said shoes and the other section protrudable outwardly beyond said first section in an outer vibratable position to increase the width of path vibrated by said shoes during vehicle travel, means supporting one shoe individually from each section of said member, and a hinge means operatively connecting said sections with a pivot axis locatable generally vertically to permit swinging in a horizontal plane of the other section between said outer position transversely aligned with said one section and an inner stowed position on the opposite side of the pivotal connection of said member to said frame to reduce the vibrated path width, means associated with the shoe of the other section for retaining the shoe of the other section in the stowed position to at least partially counterbalance the shoe on said first section when the latter is lifted out of material contact.

39. In a material compacting vehicle, a frame, two rolling support means for supporting the vehicle on and propelling it over said material with one at the front and the other at the rear of said frame spaced apart in the longitudinal direction of vehicle travel, means associated with said frame for driving at least one of the rolling support means, a pair of vibratable shoes supported by the frame between said front and rear rolling support means and adapted to slide over and to compact material during vehicle travel, one of said shoes being located during compacting in a compacting position within the lateral confines of the path of said frame and between said front and rear rolling support means and the other being located in one position during compacting outside of the path of said frame with the other shoe approximately laterally abutting said one shoe to provide a substantially laterally continuous compacting path width, and means operatively connecting said other shoe and said frame so that the outer edge of said other shoe is laterally movable inwardly to another position to reduce the lateral dimension of said vehicle and of the compacted path, said shoes being located in all positions longitudinally between said front and rear rolling support means.

40. In combination, a vehicle having a frame; a plurality of vibratable shoes with each being vibrated by a fluid motor driven vibrator thereon; a shoe support member including a cross tube extending generally transverse to the direction of vehicle travel, said member including two interconnected sections with one being pivotally connected for relative movement about a horizontal transverse axis to said frame for raising and lowering said shoes and the other section protrudable outwardly beyond said first section in an outer vibratable position to increase the width of path vibrated by said shoes during vehicle travel; means for supporting at least two shoes individually from said first section and one shoe from said second section; a hinge means operatively connecting said sections with a pivot axis locatable generally vertically to permit swinging in a horizontal plane of the other section between said outer position transversely aligned with said one section and an inner inactive stowed position located on the opposite side of the pivotal connection of said member to said frame to reduce the vibrated path width and overall width of the vehicle; coacting locking means on said sections to lock them selectively in either of said positions; means operatively associated with the shoe of said other section for permitting the shoe of said other section to vibrate in the outer vibratable position and for preventing vibration in the inner inactive position; means for detachably connecting the shoe of said other section to the frame in the inner position for supporting it out of material contact during material vibrating contact by the shoe of said one section; and an extensible link pivotally connected to said member and to said frame at opposite ends for raising and lowering said member; said supporting means for each shoe including an arm horizontally extending along the direction of vehicle travel and operatively connected substantially rigid thereto by a resilient dampener coupling means to resist the couple caused by material contact by said shoes during vehicle travel and to isolate the vibration, and pivot means between said arm and member spaced along said arm from its associated shoe and having a generally horizontal transverse axis, said pivot means including coacting shaft and sleeve elements with one element carried by the arm and the other by the member and including a rubber dampener bushing having opposite surfaces fixed respectively relative to said elements and for permitting pivotal movement therebetween by torsion of the rubber and for dampening the shoe vibration; a pair of stop means on said member spaced fore and aft on opposite sides of said pivot means and adapted to be disengaged from said arms during shoe vibrating contact with the material so as not to interfere with the vibrating action but adapted to engage the arms on opposite sides of said pivot means during substantial upward movement of the member relative to the frame about the pivotal connection therewith so as to lift said shoes and to limit the pivotal movement at said pivot means and to reduce stress on said rubber dampeners and adapted for tilting the shoes up or down for sledding during vehicle travel by a smaller up or down movement of the member; said member being constructed so that after the shoes are raised out of material contact the hinge axis is generally vertically aligned to permit easy swinging between said positions; said shoe in the stowed position at least partially counterbalancing the shoe on said first section when the latter is lifted out of material contact; said cross tube providing one of said stop means common to all of said arms and the portion of said tube in said first section serving as a fluid manifold in the fluid flow circuit; and a fluid flow line between at least two shoes and said cross tube portion.

41. In the combination set forth in claim 40, two rolling support means with one at the front and the other at the rear of said vehicle frame with each having a large ground material surface contact, a motor on said frame with its weight located over and driving the rear rolling support means, said vibratable shoes being suspended from and generally below the frame located generally between the two rolling support means and adapted to slide over and to compact material during vehicle travel, an operator carrying station on said frame located approximately over said shoes, said shoes being non-synchronously vibrated relative to said frame with each having a vertical component of movement, said frame including a common weight extending over and exerting down pressure on at least said two shoes of said first section, a plurality of resilient springs with one operatively connected between each shoe and the weight to exert down pressure of the weight on its associated shoe, said springs being stiff enough to exert substantial downward force on their associated shoes but not stiff enough to support the entire weight of the vehicle and not stiff enough to reduce the driving friction of said rolling support means below the vehicle retarding friction of shoe vibrating contact with said material, whereby vibration of the shoes and of shoe impacts with the material does not induce substantial amplitude of vibration to said weight and resilient springs, a fluid tank and a fluid pump and a fluid cooling means located on said frame remote from said shoes, fluid flow conduit means including said cross tube first section and said flow lines operatively connecting said tank, pump, fluid motors and cooling means whereby said pump pumps the fluid under pressure from said tank to said motors and back to the tank with said cooling means at least partially dissipating the heat when necessary from at least part of the fluid, said conduit means including a section having parallel flow paths back to said tank from at least one of said shoe motors, said cooling means being in one of said flow paths and fluid temperature responsive flow controlling means at a junction end of said paths for selectively controlling the flow through the paths so that the cooling means is effective when fluid temperature exceeds a predetermined amount, the fluid from the remainder of said shoe motors flowing directly back to said tank through said cross tube first section without cooling, a disengageable clutch driven by said motor, and a common drive means driven by said clutch and driving both said rear rolling support means and said pump whereby shoe vibration occurs only during clutch engagement when said rear rolling support means is being driven and said vehicle is moving; each shoe comprising a housing including a sole plate with a material contacting face, a vibrator including two unbalanced equal masses each rotatably mounted in a first chamber of said housing for vibrating said shoe along a line extending generally transverse to the length of said arm from said pivot means and extending through the center of the plate face and adapted to rotate synchronously but in opposite directions, a fluid actuated gear type driving motor with two equal sized meshing gears rotatably mounted in a second chamber of said housing and with each gear thereof operatively connected to rotate one of said masses, said operative connection including two parallel shafts with each having secured thereto one of said gears and one of said unbalanced masses so that the gears drive said masses synchronously but in opposite directions, each shaft being supported in said housing by only two only radially loadable bearings located at opposite sides of the associated unbalanced mass and with the gear adjacent one of said bearings, said second chamber having inlet high and outlet low pressure ports straddling the mesh of said gears with said gears being rotatably supported in said housing to permit carrying fluid from one port to the other in the pockets between the gear teeth, said gears being made of relatively soft bearing-like material and being dimensioned to have a tooth strength less than one-half the total load of rotating both said masses, said gears being formed of material having a higher coefficient of thermal expansion than the surrounding second chamber and fitted to prevent appreciable leakage therepast when rotating under normal operating conditions so as to permit a start with a cold motor and fluid at normal operating temperature, said gears having a pressure angle of approximately 30° to minimize tooth size and maximize the volume of the pockets therebetween to maximize the fluid transfer for a given gear size while not increasing the shaft bearing load, said gears having a contact ratio of approximately one to minimize the compression of fluid in the space between the contact points on the meshing gear teeth and to minimize shaft bearing load while still permitting smooth rotation of the shafts as the masses rotate at constant speed, said housing including a single one-piece end cap for closing the outer end of the second chamber and closing the pockets on the outer side of the gears, said gears being rigidly secured to their shafts for locating the masses axially and for absorbing end thrust, said housing completely enclosing said fluid motor and rotatable unbalanced masses against fluid leakage or dirt entry except by said ports, said housing including a fluid passageway from the inlet port to said first chamber for cooling purposes and when the fluid is oil for lubricating purposes and including a vent means in said housing from said first chamber to said outlet port, the relatively loose fit of the gears in said housing being part of said passageway and permitting substantial leakage of fluid past the gears when cold to assure adequate fluid in the first chamber during starting, each of said unbalanced masses including a weight being located within a cylinder carried coaxially on its associated shaft; said arm and shoe being dimensioned so that the line of impact by said shoe on generally uniform smooth material extends generally perpendicular to the length of the arm from said pivot means, said line of impact and line of vibration generally corresponding and extending through the center of percussion about said pivot means, a first weight carried by said shoe plate on the opposite side of said arm to counterbalance said motor, and a second weight carried by said shoe plate on the pivot means side of said masses to properly locate the center of percussion, said center of percussion being a distance L from said pivot wherein $$L = \frac{I}{Mh}$$

and wherein I is the moment of inertia of the mass M about the pivot means, $h$ is the distance from the pivot means to the center of gravity of the mass M, and M is the mass of the arm and shoe.

42. In a material compacting construction, a shoe supporting member, an arm pivotally mounted to said member, a material engageable compacting shoe carried by the arm spaced from said pivot by connecting means constructed to cause said shoe to act as a compound pendulum with said arm about said pivot, and means for vibrating said shoe, said arm and shoe being dimensioned so that the line of impact by said shoe on generally uniform smooth material extends through the center of percussion of said shoe and arm about said pivot and extends generally perpendicular to the length of the arm from said pivot.

43. In a material compacting construction, a shoe supporting member, an arm pivotally mounted to said member, a material engageable compacting shoe connected at least semi-rigidly to the arm spaced from said pivot to prevent substantial movement of said shoe relative to said arm, and means for vibrating said shoe along a line extending through the center of percussion of said arm and shoe about said pivot and extending generally transverse to the length of said arm from said pivot.

44. In a material compacting construction, a shoe supporting member, an arm pivotally mounted to said member, a material engageable compacting shoe connected at least semi-rigidly to the arm spaced from said pivot to prevent substantial movement of said shoe relative to said arm, said shoe including two synchronized and opposed unbalanced masses rotatable in opposite directions for vibrating said shoe along a line extending through the center of percussion of said arm and shoe about said pivot and extending generally transverse to the length of said arm from said pivot, said shoe including a drive motor for driving said masses.

45. In a material compacting construction, a shoe supporting member, an arm pivotally mounted to said member, a material engageable compacting shoe connected at least semi-rigidly to the arm spaced from said pivot to prevent substantial movement of said shoe relative to said arm, and means for vibrating said shoe along a line extending through the center of percussion about said pivot and extending generally transverse to the length of said arm from said pivot, said arm and shoe being dimensioned so that the line of impact by said shoe on generally uniform smooth material extends through the center of percussion of said arm and shoe about said pivot and extends generally perpendicular to the length of the arm from said pivot, said line of impact and line of vibration generally corresponding, whereby force of translation on said pivot by said vibration is minimized.

46. In a material compacting construction, a shoe supporting member, an arm pivotally mounted to said member, a material engageable compacting shoe carried by the arm spaced from said pivot, said shoe including a sole plate with a material compacting face and including two synchronized and opposed unbalanced masses rotatable in opposite directions carried by said plate for vibrating said shoe along a line extending through the center of percussion about said pivot and extending generally transverse to the length of said arm from said pivot and extending through the center of the plate face, said shoe including a drive motor carried by said plate for driving said masses, said arm and shoe being dimensioned so that the line of impact by said shoe on generally uniform smooth material extends through the center of percussion of said arm and shoe about said pivot and extends generally perpendicular to the length of the arm from said pivot, said line of impact and line of vibration generally corresponding, said shoe including a first weight carried by said shoe plate on the opposite side of said arm to counterbalance said motor, and said shoe including a second weight carried by said shoe plate on the pivot side of said masses to properly locate the center of percussion, said center of percussion being a distance L from said pivot wherein $$L = \frac{I}{Mh}$$

and wherein I is the moment of inertia of the mass M about the pivot, $h$ is the distance from the pivot to the center of gravity of the mass M, and M is the mass of the arm and shoe.

47. In a material compacting construction, a shoe supporting member, an arm pivotally mounted to said member, a material engageable compacting shoe carried by the arm spaced from said pivot, said shoe including a sole plate with a material compacting face and including two synchronized and opposed unbalanced masses rotatable in opposite directions carried by said plate for vibrating said shoe along a line extending through the center of percussion about said pivot and extending generally transverse to the length of said arm from said pivot and extending through the center of the plate face, said shoe including a drive motor carried by said plate for driving said masses, said arm and shoe being dimensioned so that the line of impact by said shoe on generally uniform smooth material extends through the center of percussion of said arm and shoe about said pivot and extends generally perpendicular to the length of the arm from said pivot, said line of impact and line of vibration generally corresponding, and the unit comprising said shoe and arm including weight means carried thereby to properly locate the center of percussion, said center of percussion being a distance L from said pivot wherein $$L = \frac{I}{Mh}$$

and wherein I is the moment of inertia of the mass M about the pivot, $h$ is the distance from the pivot to the center of gravity of the mass M, and M is the mass of the arm and shoe.

48. In a material compacting vehicle, a frame, two rolling support means with one at the front and the other at the rear of said frame, a motor on said frame for driving one of the rolling support means, a vibratable shoe carried by said frame and adapted to slide over and to compact material during vehicle travel by the shoe exerting pressure on the material, means for vibrating said shoe by a fluid motor means including a fluid pump, a disengageable clutch driven by said motor, and a common drive means driven by said clutch and driving both said one rolling support means and the fluid pump of said shoe vibrating means, whereby shoe vibration occurs only during clutch engagement when said one rolling support means is being driven and said vehicle is moving.

49. A combination, as set forth in claim 48, with means in the drive from said motor for selectively de-energizing said vibrating means while permitting said driving means to propel said vehicle without vibrating said shoe.

References Cited in the file of this patent

UNITED STATES PATENTS

| Number | Name | Date |
|---|---|---|
| 1,058,153 | Clark | Apr. 8, 1913 |
| 1,070,326 | Coutant et al. | Aug. 12, 1913 |
| 1,364,605 | Ashmore et al. | Jan. 4, 1921 |
| 1,654,014 | Proctor et al. | Dec. 27, 1927 |
| 1,819,866 | Cameron | Aug. 18, 1931 |
| 2,025,703 | Baily et al. | Dec. 31, 1935 |
| 2,080,921 | Jackson | May 18, 1937 |
| 2,094,910 | Baily | Oct. 5, 1937 |
| 2,114,069 | Aitken | Apr. 12, 1938 |
| 2,114,412 | Wilson et al. | Apr. 19, 1938 |
| 2,116,816 | Winkler | May 10, 1938 |
| 2,183,541 | Centervall | Dec. 19, 1939 |
| 2,209,656 | Mall | July 30, 1940 |
| 2,215,888 | Swarthout | Sept. 24, 1940 |
| 2,223,024 | Beierlein | Nov. 26, 1940 |
| 2,243,251 | Gustafson | May 27, 1941 |
| 2,329,331 | Brosemer | Sept. 14, 1943 |
| 2,411,317 | Day et al. | Nov. 19, 1946 |
| 2,430,816 | Jackson | Nov. 11, 1947 |
| 2,436,251 | Dobie et al. | Feb. 17, 1948 |
| 2,598,538 | Haynes | May 27, 1952 |
| 2,633,781 | Day | Apr. 7, 1953 |
| 2,659,584 | Dorkins | Nov. 17, 1953 |
| 2,687,071 | Day | Aug. 24, 1954 |
| 2,688,846 | Von Ruden | Sept. 14, 1954 |
| 2,723,608 | Jackson | Nov. 15, 1955 |
| 2,737,094 | Jackson | Mar. 6, 1956 |
| 2,749,097 | Billner | June 5, 1956 |
| 2,771,012 | Jackson | Nov. 20, 1956 |
| 2,828,676 | Stuerman | Apr. 1, 1958 |

FOREIGN PATENTS

| Number | Country | Date |
|---|---|---|
| 792,777 | France | Oct. 28, 1935 |
| 503,373 | Great Britain | Apr. 5, 1939 |
| 504,059 | Great Britain | Apr. 19, 1939 |
| 525,761 | Great Britain | Sept. 4, 1940 |
| 132,118 | Australia | Apr. 8, 1949 |
| 1,057,199 | France | Oct. 28, 1953 |
| 502,020 | Canada | May 4, 1954 |

OTHER REFERENCES

The Military Engineer, p. 454, November-December 1952.

Popular Science, p. 135, August 1950.